(12) United States Patent
Luce et al.

(10) Patent No.: US 8,698,038 B2
(45) Date of Patent: **\*Apr. 15, 2014**

(54) METHOD AND APPARATUS FOR THE AUTOMATED APPLICATION OF HARDFACING MATERIAL TO ROLLING CUTTERS OF EARTH-BORING DRILL BITS

(75) Inventors: David K. Luce, Splendora, TX (US); Alan J. Massey, Houston, TX (US); Kenneth E. Gilmore, Cleveland, TX (US); Keith L. Nehring, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1039 days.

This patent is subject to a terminal disclaimer.

(21) Appl. No.: 12/562,797

(22) Filed: Sep. 18, 2009

(65) Prior Publication Data

US 2010/0065337 A1 Mar. 18, 2010

Related U.S. Application Data

(60) Provisional application No. 61/097,945, filed on Sep. 18, 2008.

(51) Int. Cl.
*B23K 9/04* (2006.01)
*B23K 10/02* (2006.01)
*E21B 10/50* (2006.01)

(52) U.S. Cl.
USPC ....... 219/121.59; 175/327; 175/331; 175/375

(58) Field of Classification Search
USPC ............. 219/121.59; 175/327, 331, 343, 375; 427/446; 901/42
See application file for complete search history.

(56) References Cited

U.S. PATENT DOCUMENTS 3,777,115 A * 12/1973 Kazlauskas et al. ..... 219/124.34
3,865,525 A    2/1975 Dunn (Continued)

FOREIGN PATENT DOCUMENTS

CA    2458158    2/2004
EP    0049899    4/1982

(Continued)

OTHER PUBLICATIONS

Gatto, A.; Bassoli, E.; and Fornari, M., "Plasma Transferred Arc Deposition of Powdered High Performances Alloys: Process Parameters Optimisation as a Function of Alloy and Geometrical Configuration", Surface & Coatings Technology, vol. 187 (2-3), pp. 265-271 (2004).

(Continued)

*Primary Examiner* — Colleen Matthews
*Assistant Examiner* — William Harriston
(74) *Attorney, Agent, or Firm* — Sutton McAughan Deaver, PLLC

(57) ABSTRACT

The present invention relates to a system and method for automated or "robotic" application of hardfacing to the surface of a steel-toothed cutter of a rock bit. In particular, the system incorporates a grounded adapter plate and chuck mounted to a robotic arm for grasping and manipulating a rock bit cutter beneath an electrical or photonic energy welding source, such as a plasma arc welding torch manipulated by a positioner. In this configuration, the torch is positioned substantially vertically and oscillated along a horizontal axis as the cutter is manipulated relative along a target path for the distribution of hardfacing. Moving the cutter beneath the torch allows more areas of more teeth to be overlayed, and allows superior placement for operational feedback, such as automatic positioning and parameter correction. In the preferred embodiment, sensors provide data to the control system for identification, positioning, welding program selection, and welding program correction. The control system, aided by data from the sensors, manipulates the robotically held cutter while controlling the operation and oscillation of the torch.

44 Claims, 17 Drawing Sheets

(56) References Cited

U.S. PATENT DOCUMENTS

| | | | |
|---|---|---|---|
| 4,182,394 | A | 1/1980 | Cason, Jr. |
| 4,228,339 | A | 10/1980 | Scales et al. |
| 4,309,587 | A | 1/1982 | Nakano et al. |
| 4,358,471 | A | 11/1982 | Derkacs et al. |
| 4,373,128 | A | 2/1983 | Asai et al. |
| 4,396,077 | A | 8/1983 | Radtke |
| 4,411,935 | A | 10/1983 | Anderson |
| 4,546,902 | A | 10/1985 | Anderson |
| 4,567,343 | A | 1/1986 | Sullivan et al. |
| 4,689,463 | A | 8/1987 | Shubert |
| 4,763,736 | A | 8/1988 | Varel, Sr. |
| 4,814,234 | A | 3/1989 | Bird |
| 4,835,357 | A | 5/1989 | Schalk |
| 4,836,307 | A | 6/1989 | Keshavan et al. |
| 4,864,094 | A | 9/1989 | Saltzman et al. |
| 4,866,241 | A | 9/1989 | Doherty et al. |
| 4,923,511 | A | 5/1990 | Krizan et al. |
| 5,010,225 | A | 4/1991 | Carlin |
| 5,038,640 | A | 8/1991 | Sullivan et al. |
| 5,152,194 | A | 10/1992 | Keshavan et al. |
| 5,226,977 | A | 7/1993 | Kitaguchi et al. |
| 5,233,150 | A | 8/1993 | Schneebeli et al. |
| 5,254,923 | A | 10/1993 | Kanitani |
| 5,293,026 | A | 3/1994 | Dennis et al. |
| 5,314,722 | A | 5/1994 | Kobayashi |
| 5,524,510 | A | 6/1996 | Davies et al. |
| 5,535,838 | A | 7/1996 | Keshavan et al. |
| 5,645,896 | A | 7/1997 | Mills |
| 5,755,298 | A | 5/1998 | Langford, Jr. et al. |
| 5,755,299 | A | 5/1998 | Langford, Jr. et al. |
| 5,866,872 | A | 2/1999 | Lu et al. |
| 5,893,204 | A | 4/1999 | Symonds |
| 5,900,272 | A | 5/1999 | Goodman |
| 5,921,330 | A | 7/1999 | Sue et al. |
| 5,935,350 | A | 8/1999 | Raghu et al. |
| 5,942,289 | A | 8/1999 | Jackson |
| 6,124,564 | A | 9/2000 | Sue et al. |
| 6,138,779 | A | 10/2000 | Boyce |
| 6,375,895 | B1 | 4/2002 | Daemen |
| 6,380,512 | B1 | 4/2002 | Emer |
| 6,392,190 | B1 * | 5/2002 | Sue et al. ............... 219/121.59 |
| 6,601,475 | B2 | 8/2003 | Davies et al. |
| 6,615,936 | B1 | 9/2003 | Mourik et al. |
| 6,649,682 | B1 | 11/2003 | Breton et al. |
| 6,698,098 | B2 | 3/2004 | Griffo et al. |
| 6,766,870 | B2 | 7/2004 | Overstreet |
| 6,772,849 | B2 | 8/2004 | Oldham et al. |
| 6,861,612 | B2 | 3/2005 | Bolton et al. |
| 6,972,390 | B2 | 12/2005 | Hu et al. |
| 7,034,262 | B2 | 4/2006 | Fischer et al. |
| 7,041,936 | B2 | 5/2006 | Oberzaucher et al. |
| 7,210,377 | B2 | 5/2007 | Griffo et al. |
| 7,262,240 | B1 | 8/2007 | Breton et al. |
| 7,361,411 | B2 | 4/2008 | Daemen et al. |
| 2002/0017402 | A1 | 2/2002 | Bird |
| 2004/0108145 | A1 | 6/2004 | Siracki |
| 2005/0077090 | A1 | 4/2005 | Viswanadham et al. |
| 2006/0177689 | A1 | 8/2006 | Muir et al. |
| 2010/0104736 | A1 * | 4/2010 | Luce et al. ............... 427/8 |

FOREIGN PATENT DOCUMENTS

| | | |
|---|---|---|
| EP | 0194050 | 9/1986 |
| EP | 0351039 | 1/1990 |
| EP | 0496181 | 7/1992 |
| EP | 0573135 | 12/1993 |
| GB | 1 323 672 | 7/1973 |
| GB | 2 276 886 A | 10/1994 |
| GB | 2293 615 A | 4/1996 |
| GB | 2 295 157 A | 5/1996 |
| GB | 2 276 886 B | 4/1997 |
| GB | 2 311 085 A | 9/1997 |
| JP | 05-131289 A | 5/1993 |
| JP | 08-141744 A | 6/1996 |
| JP | 2005-524533 A | 8/2005 |
| WO | 9706339 | 2/1997 |
| WO | 2009/043369 A1 | 4/2009 |

OTHER PUBLICATIONS

Buske, R.; Rickabaugh, C.; Bradford, J.; Lukasewich, H.; and Overstreet, J., "Performance Paradigm Shift: Drilling Vertical and Directional Sections Through Abrasive Formations with Roller Cone Bits", SPE Paper No. 11497, pp. 1- 16, Jun. 16-19, 2008 (Calgary, Alberta, Canada).

Kang, K.H., International Search Report for International Patent Application No. PCT/US2009/057373, Korean Intellectual Property Office, Republic of Korea, dated Apr. 30, 2010.

Kang, K.H., Written Opinion for International Patent Application No. PCT/US2009/057373, Korean Intellectual Property Office, Republic of Korea, dated Apr. 30, 2010.

Jae Woo Park, International Search Report for International Patent Application No. PCT/US2009/069095, Korean Intellectual Property Office, dated Jul. 29, 2010.

Jae Woo Park, Written Opinion for International Patent Application No. PCT/US2009/069095, Korean Intellectual Property Office, dated Jul. 29, 2010.

Berge, James M., "Automating the Welding Process, Successful Implementation of Automated Welding Systems," Copyright 1994 by Industrial Press Inc., New York, NY.

Cary, Howard B., "Arc Welding Automation," Copyright 1995 by Marcel Dekker, Inc., New York, NY, Chapters 1-20. (submitted in seven parts).

"EZCase Casing Bit System," Copyright 2007 by Baker Hughes Incorporated, www.HCCbits.com, 2 pages.

"EZReam Casing/Liner Shoe," Copyright 2007 by Baker Hughes Incorporated, www.HCCbits.com, 2 pages.

"GaugePro XPR Expandable Reamer," Copyright 2008 by Baker Hughes Incorporated, www.HCCbits.com, 2 pages.

Creating E & P. Value, inDepth TM, vol. 10, No. 1, 2004, Copyright 2004 by Baker Hughes Incorporated, pp. 6-60.

Ream-While-Drilling Technology Operations Manual (RWD2), Copyright 2007 by Baker Hughes Incorporated, pp. 6-148.

International Search Report for International Application No. PCT/US2009/061632 mailed May 10, 2010, 3 pages.

International Written Opinion for International Application No. PCT/US2009/061632 mailed May 10, 2010, 3 pages.

International Search Report for International Application No. PCT/US2009/061239 mailed May 20, 2010, 3 pages.

International Written Opinion for International Application No. PCT/US2009/061239 mailed May 20, 2010, 3 pages.

* cited by examiner

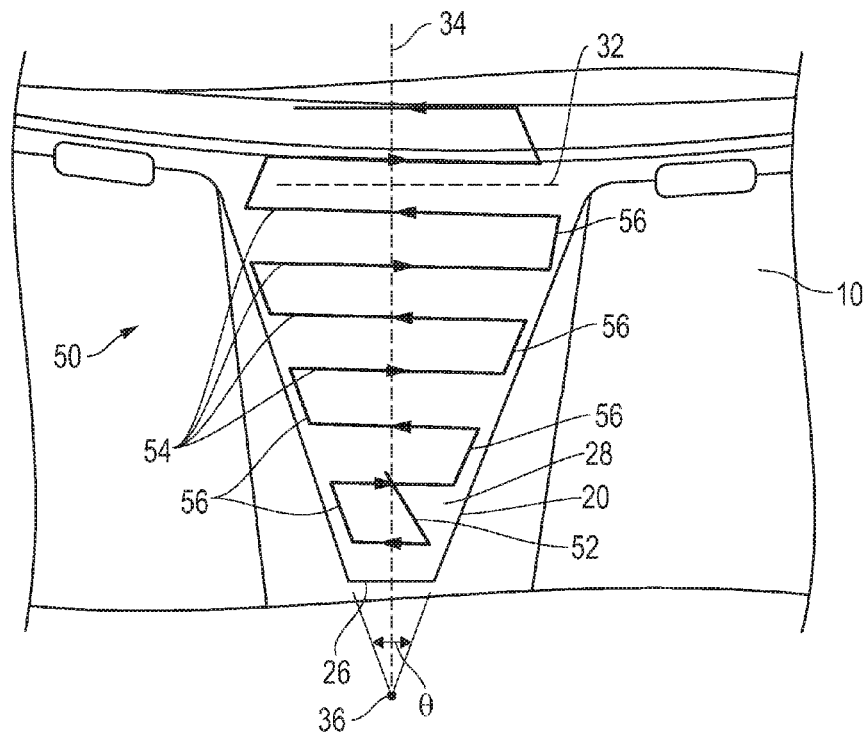
FIG. 17
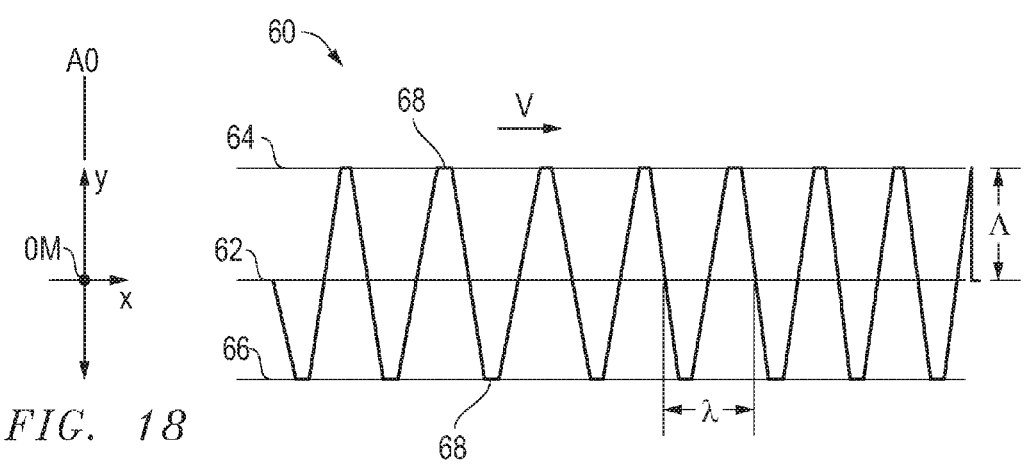
FIG. 18
FIG. 19

METHOD AND APPARATUS FOR THE AUTOMATED APPLICATION OF HARDFACING MATERIAL TO ROLLING CUTTERS OF EARTH-BORING DRILL BITS

CROSS-REFERENCE TO RELATED APPLICATIONS

The present application claims priority to U.S. Provisional Patent Application Ser. No. 61/097,945, filed on Sep. 18, 2008, the contents of all of which are incorporated herein by reference in its entirety.

TECHNICAL FIELD OF THE INVENTION

The present invention relates to a system and method for automated or "robotic" application of hardfacing to the surface of a steel-toothed cutter of a rock bit. In particular, the system incorporates an adapter plate and chuck mounted to a robotic arm for manipulating a rock bit cutter under a plasma arc welding torch manipulated by a positioner. Sensors provide data to the control system for identification, positioning, welding program selection, and welding program correction. The control system, aided by data from the sensors, manipulates the robotically held cutter while controlling the operation and oscillation of the torch.

BACKGROUND OF THE INVENTION

In the exploration of oil, gas, and geothermal energy, drilling operations are used to create boreholes, or wells, in the earth. These operations normally employ rotary and percussion drilling techniques. In rotary drilling, the borehole is created by rotating a tubular drill string with a drill bit secured to its lower end. As the drill bit deepens the hole, tubular segments are added to the top of the drill string. While drilling, a drilling fluid is continually pumped into the drilling string from surface pumping equipment. The drilling fluid is transported through the center of the hollow drill string and into the drill bit. The drilling fluid exits the drill bit at an increased velocity through one or more nozzles in the drill bit. The drilling fluid then returns to the surface by traveling up the annular space between the borehole and the outside of the drill string. The drilling fluid carries rock cuttings out of the borehole and also serves to cool and lubricate the drill bit.

The type of drill bit used to drill the well will depend largely on the hardness of the formation being drilled. One type of rotary rock drill is a drag bit. Early designs for drag bits included hard facing applied to steel cutting edges. Modern designs for drag bits have extremely hard cutting elements, such as natural or synthetic diamonds, mounted to a bit body. As the drag bit is rotated, the hard cutting elements scrape against the bottom and sides of the borehole to cut away rock.

Another type of rotary rock drill is the rolling cutter bit. These drill bits have rotatable cutters mounted on bearings on the body of the drill bit, which rotate as the drill bit is rotated. Cutting elements, or teeth, protrude from the cutters. The angles of the cutters and bearing pins on which they are mounted are aligned so that the cutters essentially roll on the bottom of the hole with controlled slippage. As the rolling cutter cutters roll on the bottom of the hole being drilled, the teeth or carbide inserts apply a high compressive load to the rock and fracture it. The cutting action of rolling cutter cutters is typically by a combination of crushing, chipping and scraping. The cuttings from a rolling cutter rock bit are typically a mixture of moderately large chips and fine particles.

There are two general types of rolling cutter drill bits; TCI bits and steel-tooth bits. In the oilfield, TCI is a well-recognized abbreviation for Tungsten Carbide Insert. These bits have steel cutters with a plurality of tungsten carbide or similar inserts of high hardness that protrude from the surface of the cutter. There are numerous styles of TCI drill bits designed for various formation hardnesses, in which the shape, number and protrusion of the tungsten carbide inserts will vary, along with cutter and journal angles.

Steel-tooth bits are also referred to as milled-tooth bits, since most bits have their steel teeth created in a milling machine. However, in larger bits, it is also known to cast the steel teeth and, therefore, "steel-tooth" is the better reference. The steel-tooth bit has cutters having an integral body of hardened steel with teeth formed on the periphery. There are numerous styles of steel-tooth drill bits designed for formations of varying hardness in which the shape, number and protrusion of the teeth will vary, along with cutter and journal angles.

The cost efficiency of a drill bit is determined by the drilling life of the drill bit and, largely, the rate at which the drill bit penetrates the earth. Under normal drilling conditions, the teeth of the steel-tooth bits are subject to continuous impact and abrasive wear because of their engagement with the rock being drilled. As the teeth are worn away, the penetration rate of the drill bit is reduced, and the cost of drilling increases significantly.

To increase the cost efficiency of a steel-tooth drill bit, it is necessary to increase the wear resistance of the steel teeth. To accomplish this, in some instances, it may be desirable to deposit one or more layers of a wear-resistant material or "hardfacing" to the exposed surfaces of the steel teeth. Fusion hardfacing refers to a group of welding related techniques that apply a wear resistant alloy to a substrate metal. Common hardfacing techniques include arc welding and gas torch welding, among other welding processes.

Conventional welding techniques used to apply hardfacing to steel-tooth drill bits include oxyacetylene welding (OAW) and atomic hydrogen welding (AHW). Currently, the only method known to be in use in the commercial production of rolling cutters for rock bits is manual welding. Cutters are mounted on a positioning table, and the welder holds a welding torch and welding rod while applying the hardfacing to the desired portions of the teeth on each cutter. The welder must manually move from tooth to tooth on the cutter while addressing the cutter from various angles during the course of this process.

Conventional hardfacing materials used to add wear resistance to the steel teeth of a rotary rock bit includes tungsten carbide particles in a metal matrix, typically cobalt or a mixture of cobalt and other similar metals. Many different compositions and formulations of hardfacing material have been employed in the rock bit field to achieve wear-resistance, durability and ease of application. Typically, these hardfacing materials are supplied in the form of a welding rod, but can be found in powder form for use with other types of torches.

The quality of a hardfacing application has several physical indicators including uniformity, thickness, coverage, porosity, and other metallurgical properties. Historically, the individual skills of the welder have largely controlled the hardfacing quality. Hardfacing quality is known to vary between rock bits, and even between cutters on a rock bit, and teeth on a cutter. Limited availability of qualified welders has aggravated the problem. The manual application is extremely tedious, repetitive, skill-dependent, time-consuming, and expensive. Indeed, application of cutter hardfacing is considered the single most tedious and skill-dependent step in the manufacture of a steel-toothed rock bit. The consistency of even a skilled welder can vary during a work day.

As stated, the prior-art means of applying hardfacing to a cutter involves continuous manual, angular manipulation of a torch over the cutter, with the cutter held substantially stationary, but rotating, on a positioning table. After hardfacing is applied to a surface of each tooth by a welder holding a torch and welding rod containing the hardfacing material, the positioning table and cutter are indexed to a new angle and position to permit application of hardfacing to a surface of the next tooth. This continues until all the cutters have been rotated 360 degrees. At that time, the angle of the table and cutter would be adjusted for application to another tooth surface or row of teeth on the cutter.

When attempts to utilize robotics to automate the welding process were made, the same configuration was used, designating the robotic arm to replace the human operator's arm and his varied movements, while leaving the cutter on the positioning table. The positioning table was wired for automatic indexing between teeth and rows.

This is the intuitive configuration and procedure, which would be expected to provide the recognized benefits of manual hardfacing for a number of reasons. First, manual and automatic torches are much lighter and easier to continuously manipulate than the heavy steel cutters with teeth protruding in all directions. Second, the cutter must be electrically grounded, and this can be done easily through the stationary positioning table. Third, gravity maintains the heavy cutter in position on the positioning table. Fourth, highly angled (relative to vertical) manipulation of the torch allows access to confined spaces between teeth, a manipulation suited to the highly articulated movement of a robotic arm.

U.S. Pat. No. 6,392,190 describes a concept of robotically hardfacing cutters on a drill bit, in which the torch is held by a robotic arm and the cutters are moved on a positioning table. In particular, this patent discloses "an automated hardfacing system useful for hardfacing roller cones. The automated system includes a robot with an arm, a positioner, and a controller which co-ordinates the alignment of the robot and the positioner. The robot holds a hardfacing torch and is capable of movement in three axes of movement. These axes are the x, y, and z axes of the Cartesian co-ordinate system. The positioner holds a roller cone and is capable of movement in at least two axes of movement. The movement includes tilting and rotation about a Cartesian axis. The hardfacing coating produced by the automated system has improved quality and consistency as compared to the one obtained by a manual process." The disclosure of the '190 patent illustrates the concept of replacing the typical "manual welder" used in hardfacing applications with a robot for holding the torch, and essentially describes the rather obvious expedient of more than five movable axes in the system. However, U.S. Pat. No. 6,392,190 fails to provide any specific teaching directed to the critical details of the numerous obstacles that must be overcome to actually reduce to practice the science of robotically automating the hardfacing of rolling cutters. Indeed, to date, it is not known to have successfully automated the production of the application of hardfacing to rolling cutters.

One factor preventing commercial use of robotic hardfacing has been the unsatisfactory appearance of the final product when applied using robotically held torches over stationary cutters. Another factor preventing commercial use of robotic hardfacing to rolling cutters is the commercial unavailability of a material that directly compares to conventional Oxygen Acetylene Welding (OAW) welding rod materials that can be applied with commercially available Plasma Transferred Arc (PTA) torches.

Another factor preventing commercial use of robotic hardfacing is the inability to properly identify and locate individual rolling cutter designs within a robotic hardfacing system. The cutters of each bit size and style are different, and initiating the wrong program could cause a collision of the torch and part, resulting in catastrophic failure and loss. Another factor preventing commercial use of robotic hardfacing is the inability to correct the critical positioning between the torch and part in response to manufacturing variations of the cutter, wear of the torch, and buildup of hardfacing.

Still another factor preventing commercial use of robotic hardfacing has been the inability to properly access many of the areas on the complex surface of a rolling cutter that require hardfacing with commercially available Plasma Transferred Arc (PTA) torches large enough to permit application of the required material. A small form factor (profile) is required to access the roots of the teeth that are close together. However, most conventional PTA torches require large powder ports to accommodate the flow of the medium to large mesh powder required for good wear resistance. Torches with smaller nozzles have smaller powder ports that prohibit proper flow of the desired powders.

Another factor preventing commercial use of robotic hardfacing is the complexity of programming the control system to coordinate the critical paths and applications sequences needed to apply the hardfacing. For example, heretofore undisclosed in the prior art, the known torch operating parameters, materials, application sequences, and procedures used for decades in manual hardfacing operations have proven to be mostly irrelevant to robotic hardfacing of rolling cutters. A related factor preventing commercial use of robotic hardfacing is the cost and limitation of resources. A significant investment and commitment of machine time are required to create tests, evaluate results, modify equipment, and incrementally adjust the several operating parameters, and then integrate the variations into production part programs. These and several other obstacles have, until now, prevented any commercial practice of automated hardfacing of rolling cutters anywhere in the world.

Therefore, there is a need to develop a system and method for applying hardfacing to rolling cutters consistent with the highest material and application quality standards obtainable by manual welding. There is also a need to develop a system that identifies parts, selects the proper program, and provides programmed correction in response to manufacturing variations of the cutter, wear of the torch, and buildup of hardfacing. There is also a need to develop a PTA torch design capable of accessing more of the areas on a rolling cutter that require hardfacing. There is also a need to develop a hardfacing material which performance will compare favorably to conventional Oxygen Acetylene Welding (OAW) materials and flow properly through the PTA torch design.

SUMMARY OF THE INVENTION

The present invention provides a novel and unique system for automating the application of hardfacing to the surface of steel-tooth cutters for rotary drill bits. The present invention also provides a novel and unique method of automated application of hardfacing the surface of steel-tooth cutters for rotary drill bits.

The present invention operates in opposite configuration of manual hardfacing and opposite to the specific teachings of the prior art. In a preferred embodiment of the present invention, a robotic cutter welding system is provided, having a plasma transfer arc torch secured in a substantially vertical position to a torch positioner in a downward orientation. The torch positioner is program-controllable in a vertical plane. Shielding, plasma, and transport gases are supplied to the torch through electrically controllable flow valves. For handling a rolling cutter, a robot having program controllable movement of an articulated arm is provided. A chuck adapter is attached to the arm of the robot. A three-jaw chuck is attached to the chuck adapter. The chuck is capable of securely holding a rock bit cutter in the inverted position.

A first position sensor is positioned for determining the proximity of the torch to a surface of the rolling cutter. A second position sensor may be positioned for determining the location, orientation, or identification of the rolling cutter. A programmable control system is electrically connected to the torch, the torch positioner, the robot, shielding, plasma, and transport gas flow valves, and the position sensors for programmed operation of each. The robot is programmed to position a surface of a cutter below the torch prior to the application of welding material to the cutter.

In this configuration, the torch is oscillated in a horizontal path. The cutter is manipulated such that a programmed target path for each tooth surface is followed beneath the path midpoint (or equivalent indicator) of the oscillating torch. The movement of the cutter beneath the torch generates a waveform pattern of hardfacing. In a preferred embodiment, the target path is a type of waveform path as well. Imposing the torch waveform onto the target path waveform generates a high-quality and efficient hardfaced coating on the cutter. In another preferred embodiment, the cutter is oscillated in relation to the torch as it follows the target path. This embodiment provides the ability to generate unique and desirable hardfacing patterns on the surface of the cutter, while maintaining symmetry and coverage.

The primary advantage of the present invention is that it provides a system and method for automating the hardfacing application of rolling cutters, which increases the consistency and quality of the applied hardfacing, and thus the reliability, performance, and cost efficiency of the final product. Another advantage of the present invention is that it reduces manufacturing cost and reliance on skilled laborers. Another advantage of the present invention is that by decreasing production time, product inventory levels can be reduced. Another advantage of the present invention is that it facilitates the automated collection of welding data, from which further process controls and process design improvements can be made.

Another advantage of the present invention is that utilization of the robotic arm to manipulate the rolling cutter improves the opportunity to integrate sensors for providing feedback. Another advantage of the present invention is that utilization of the robotic arm to manipulate the rolling cutter provides the necessary surface-to-torch angularity for access, without disrupting the flow of the powder due to changes in the angle of the torch.

These aspects of the invention are not meant to be exclusive and other features, aspects, and other advantages of the present invention will be readily apparent to those of ordinary skill in the art when read in conjunction with the appended claims and accompanying drawings.

As referred to hereinabove, the "present invention" refers to one or more embodiments of the present invention, which may or may not be claimed, and such references are not intended to limit the language of the claims, or to be used to construe the claims in a limiting manner.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 17 illustrates a bottom view of a typical steel-tooth such as might be located on the steel-tooth cutter of FIG. 2, illustrating a substantially trapezoidal waveform target path for hardfacing in accordance with a preferred embodiment of the present invention.

FIG. 18 illustrates a schematic representation of the oscillation of the torch on axis of oscillation 'AO' having an oscillation midpoint 'OM' in accordance with a preferred embodiment of the present invention.

FIG. 19 illustrates a schematic representation of a substantially triangular waveform torch path for hardfacing in accordance with a preferred embodiment of the present invention.

Figure 1:
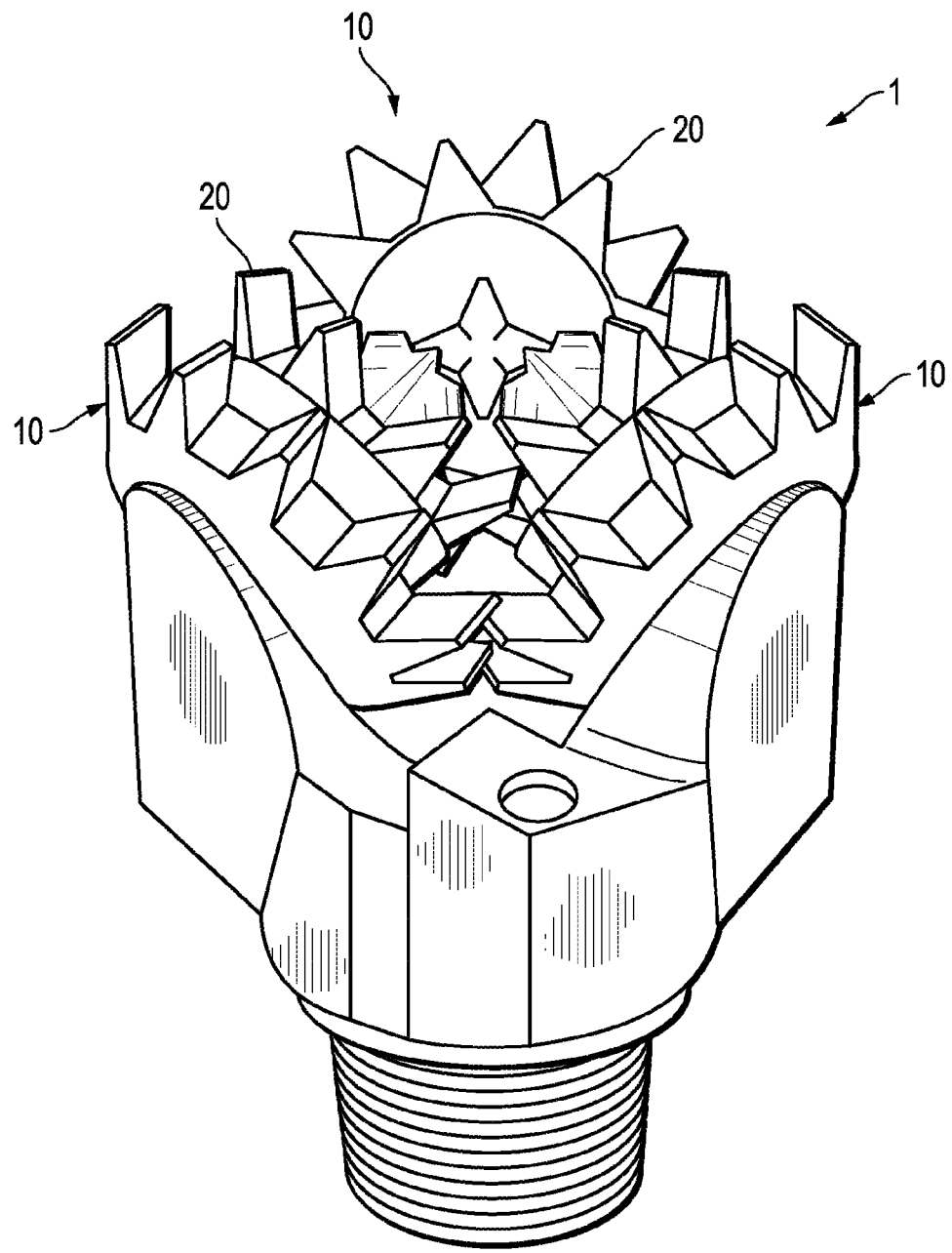
FIG. 1 illustrates a side view of a steel-tooth drill bit.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION OF THE PREFERRED EMBODIMENTS

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Figure 2:
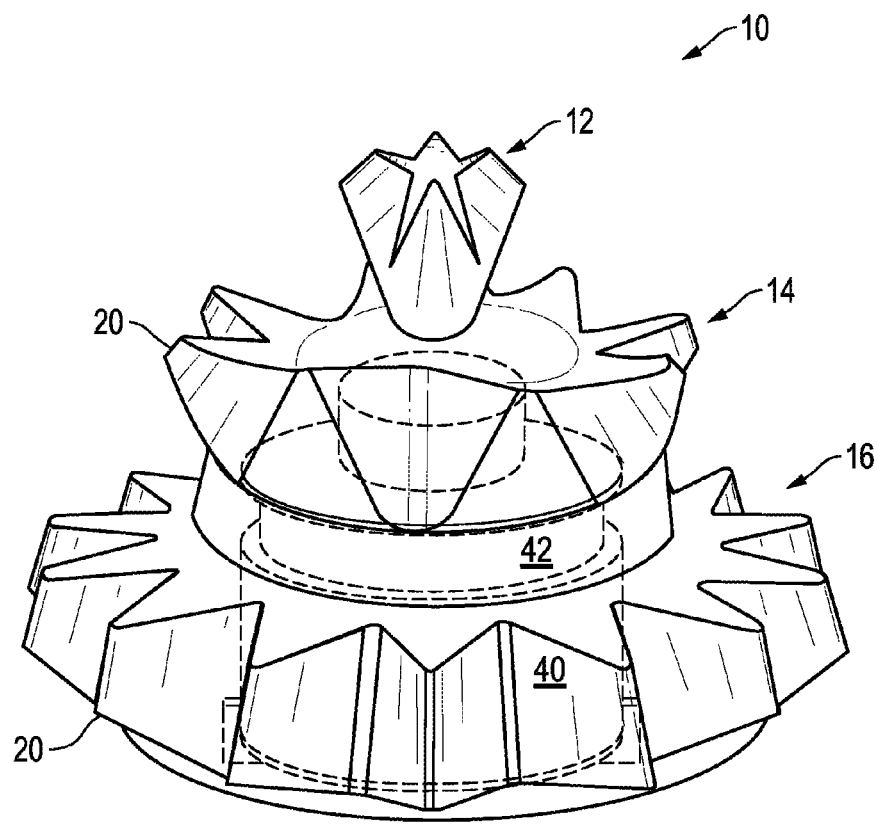
FIG. 2 illustrates an isometric view of a typical steel-tooth cutter such as might be used on the steel-tooth drill bit of FIG. 1.

Turning now to the figures, FIG. 1 illustrates a side view of an exemplary steel-tooth drill bit 1. Steel-tooth drill bit 1 has a plurality of rolling cutters, or cones 10. FIG. 2 illustrates an isometric view of a typical steel-tooth cutter 10 such as might be used on the drill bit of FIG. 1. Steel-tooth cutter 10 typically has a plurality of rows. In FIG. 2, cutter 10 has an inner row 12, an intermediate row 14, and an outer row 16. Each of rows 12, 14, and 16 has one or more teeth 20. When steel-tooth drill bit 1 is rotated at the bottom of a well bore, teeth 20 engage and remove the earthen formation.

As shown by the dashed lines, the interior of cutter 10 includes a cylindrical journal race 40 and a semi-torus shaped ball race 42. Journal race 40 and a ball race 42 are internal bearing surfaces that are finish-machined after hardfacing 38 has been applied to teeth 20.

Figure 3:
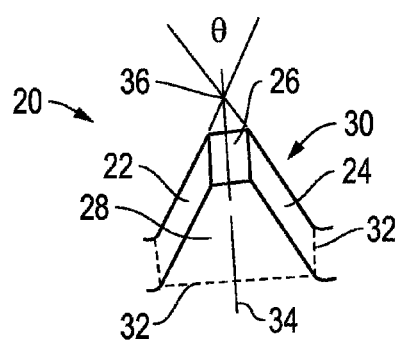
FIG. 3 illustrates an isometric view of a typical steel-tooth such as might be located on the steel-tooth cutter of FIG. 2.

FIG. 3 illustrates an isometric view of a typical steel tooth 20 such as might be located on steel-tooth cutter 10 of FIG. 2. Tooth 20 has an included tooth angle of θ degrees formed at a vertex 36. Tooth 20 has a leading flank 22 and an opposite trailing flank 24. Leading flank 22 and trailing flank 24 are joined at crest 26, which is the top of tooth 20. A generally triangular outer end 28 is formed between leading flank 22, trailing flank 24, and crest 26. On the opposite side of tooth 20, a generally triangular inner end 30 is formed between leading flank 22, trailing flank 24, and crest 26. A base 32 broadly defines the bottom of tooth 20 and the intersection of tooth 20 with cutter 10. It is well-known in the drilling industry to include various alternatively shaped teeth on cutter 10, such as teeth having T-shaped crests. Tooth 20 is generally representative of the most common teeth used in the industry, and serves the purpose of illustrating the application of the present invention, but practice of the present invention is not limited to any particular shape of steel tooth.

Figure 4:
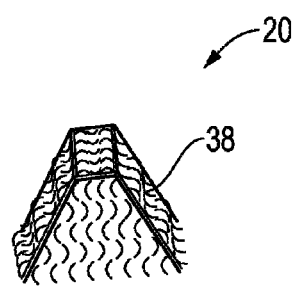
FIG. 4 illustrates an isometric view of the steel-tooth of FIG. 3 after hardfacing has been applied.

To prevent early wear and failure of drill bit 1, it is necessary to apply an extremely wear resistant material, or hardfacing 38, to surfaces 22, 24, 26, 28, and 30 of tooth 20. FIG. 4 is an isometric view of a typical steel-tooth 20 such having hardfacing 38 applied to surfaces 22, 24, 26, 28, and 30.

Figure 5:
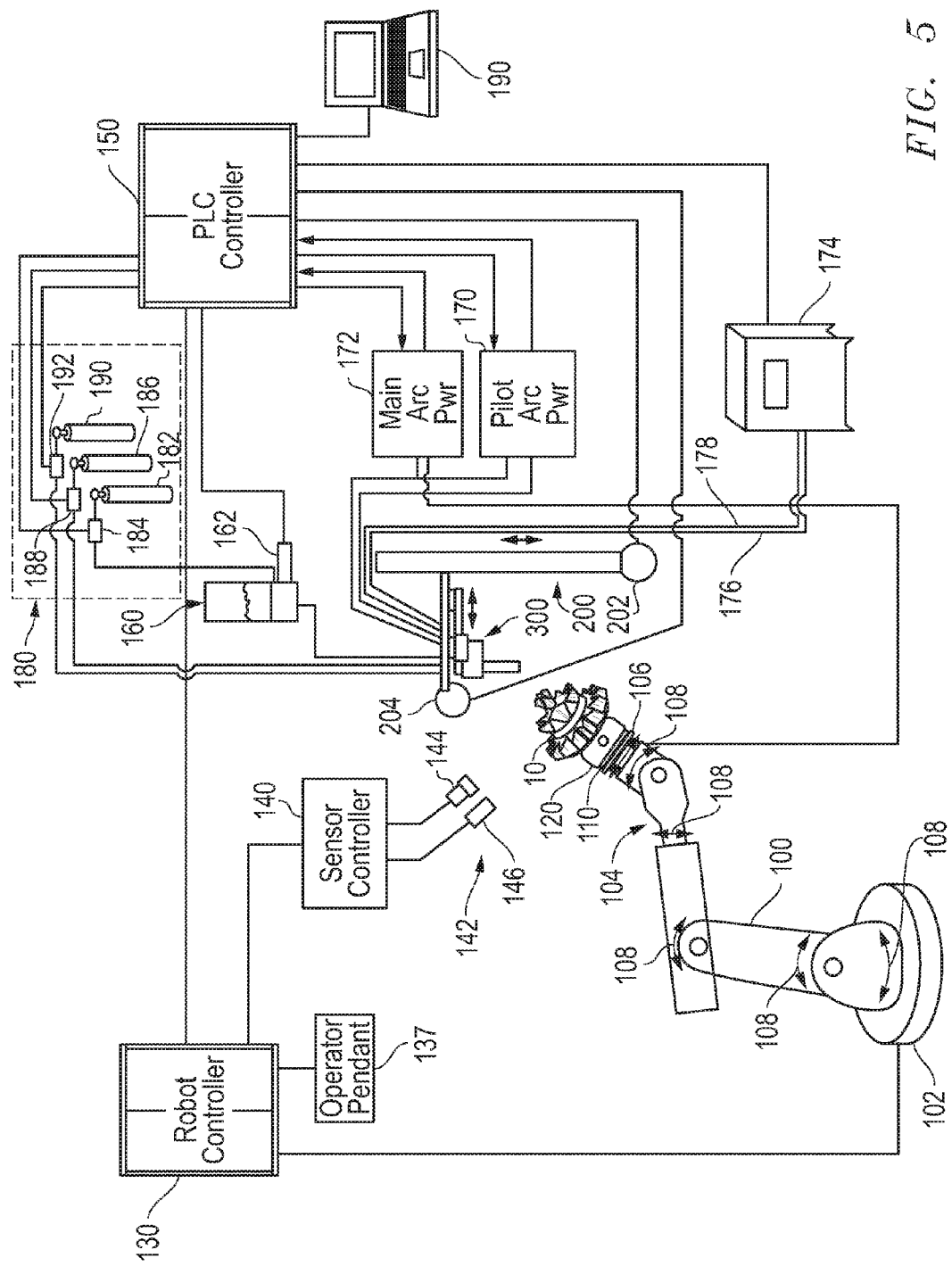
FIG. 5 illustrates a schematic of a preferred embodiment of the robotic cutter welding system of the present invention.

FIG. 5 is a schematic illustration of the system of the present invention. Seen in FIG. 5 is an industrial robot 100 having a stationary base 102 and an articulated arm 104. Articulated arm 104 has a distal end 106. Robot 100 has a plurality of axes 108 about which controllable movement permits wide-range positioning of distal end 106 relative to base 102. In the preferred embodiment, robot 100 has six independently controllable axes of movement between base 102 and the distal end 106 of arm 104.

In the preferred embodiment, robot 100 has a handling capacity of at least 125 kg, and articulated arm 104 has a wrist torque rating of at least 750 Nm. In the more preferred embodiment, robot 100 has six independently controllable axes of movement between base 102 and distal end 106 of arm 104. Examples of industrial robots that are commercially available include models IRB 6600/IRB 6500, which are available from ABB Robotics, Inc. (125 Brown Road, Auburn Hills, Mich., USA, 48326-1507).

An adapter 110 is attached to distal end 106. Adapter 110 has a ground connector 112 (see FIG. 7) for attachment to an electrical ground cable 114. A chuck 120 is attached to adapter 110. Chuck 120 securely grips cutter 10 at journal bearing surface 40 and/or ball race 42, as shown in greater detail in FIGS. 8 and 9.

In a preferred embodiment, a heat sink, or thermal barrier, is provided between cutter 10 and adapter 110 to prevent heat from causing premature failure of the rotating axis at distal end 106 of articulated arm 104. In a preferred embodiment, the thermal barrier is an insulating spacer 116 (not shown) located between cutter 10 and distal end 106 of robot 100. In another preferred embodiment, cutter 10 is gripped in a manner that provides an air space between cutter 10 and distal end 106 of robot 100 to dissipate heat.

In another preferred embodiment, chuck 120 or adapter 110 is water cooled by circulating water. Heat energy absorbed by the water is removed by a remotely located cooling unit (such as cooling unit 174, shown in FIG. 5). In another preferred embodiment, jaws 122 (FIG. 8 and FIG. 9) of chuck 120 are water cooled by circulating water. Heat energy absorbed by the water is removed by a remotely located cooling unit (such as cooling unit 174, shown in FIG. 5).

A robot controller 130 is electrically connected to robot 100 for programmed manipulation of robot 100, including movement of articulated arm 104. In a preferred embodiment, an operator pendant 137 may be provided as electrically connected to robot controller 130 for convenient operator interface with robot 100. A sensor controller 140 is electrically connected to robot controller 130. Sensor controller 140 may also be electrically connected to a programmable logic controller 150.

A plurality of sensors 142 are electrically connected to sensor controller 140. In a preferred embodiment, sensors 142 include a camera 144 and/or a contact probe 146. In an alternative embodiment, sensors 142 include a laser proximity indicator 148 (not shown). Other types of sensors 142 may also be used. Sensors 142 provide interactive information to robot controller 130, such as the distance between a tooth 20 on cutter 10 and torch 300.

A programmable logic controller 150 is electrically connected to robot controller 130. Programmable logic controller (PLC) 150 provides instructions to auxiliary controllable devices that operate in coordinated and programmed sequence with robot 100.

A powder dosage system 160 is provided for dispensing hardfacing powder to the system. A driver 162 is electrically connected to PLC 150 for dispensing the powder at a predetermined, desired rate.

A pilot arc power source 170 and a main arc power source 172 are electrically connected to PLC 150. A cooling unit 174 is electrically connected to PLC 150. In the preferred embodiment, a data-recording device 190 is electrically connected to PLC 150.

A gas dispensing system 180 is provided. A transport gas source 182 supplies transport gas through a flow controller 184 to carry or transport hardfacing welding powder to torch 300. Flow controller 184 is electrically connected to PLC 150, which controls the operation of flow controller 184 and the flow and flow rate of the transport gas. A plasma gas source 186 supplies gas for plasma formation through a flow controller 188. Flow controller 188 is electrically connected to PLC 150, which controls the operation of flow controller 188 and the flow and flow rate of the plasma gas. Similarly, a shielding gas source 190 supplies shielding gas through a flow controller 192. Flow controller 192 is electrically connected to PLC 150, which controls the operation of flow controller 192 and the flow and flow rate of the shielding gas. It is known to utilize a single gas source for more than one purpose, e.g. plasma, shielding, and transport. Thus different, multiple flow controllers connected in series alignment can control the flow and flow rate of gas from a single gas source.

A torch 300 is provided. In the preferred embodiment, torch 300 is a plasma transferred arc (PTA) torch, that receives hardfacing welding powder from powder dosage system 160, and plasma, transport, and shielding gases from their respective supplies and controllers in gas supply system 180. Torch 300 is secured to a positioner or positioning table 200, which grips and manipulates torch 300. In the preferred embodiment, positioner 200 is capable of programmed positioning of torch 300 in a substantially vertical plane. In this embodiment, positioner 200 has a vertical drive 202 and a horizontal drive 204. Drives 202 and 204 may be toothed belts, ball screws, a toothed rack, pneumatic, or other means.

Figure 6:
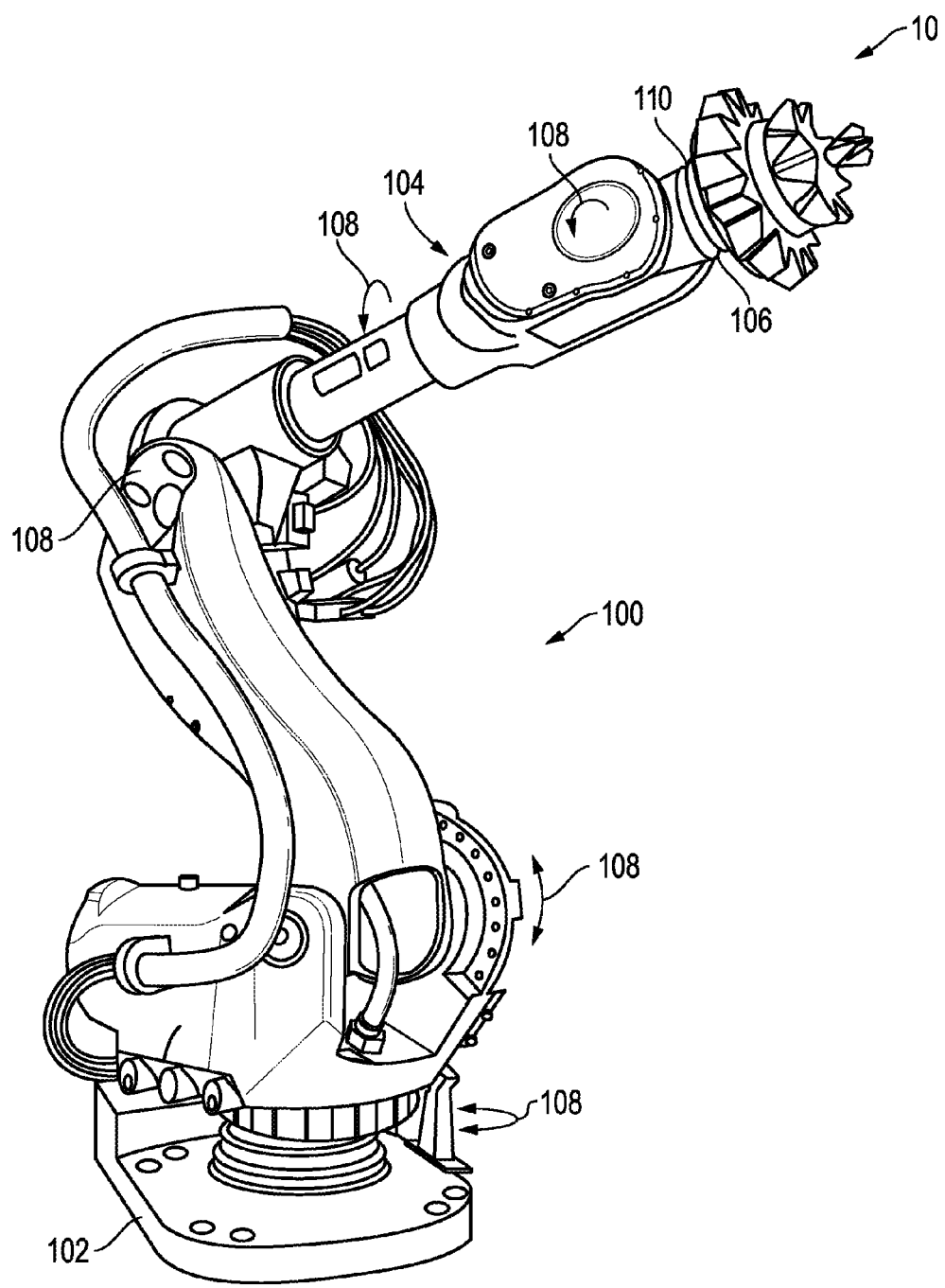
FIG. 6 illustrates an isometric view of the robot manipulating a cutter to be hardfaced.
Figure 7:
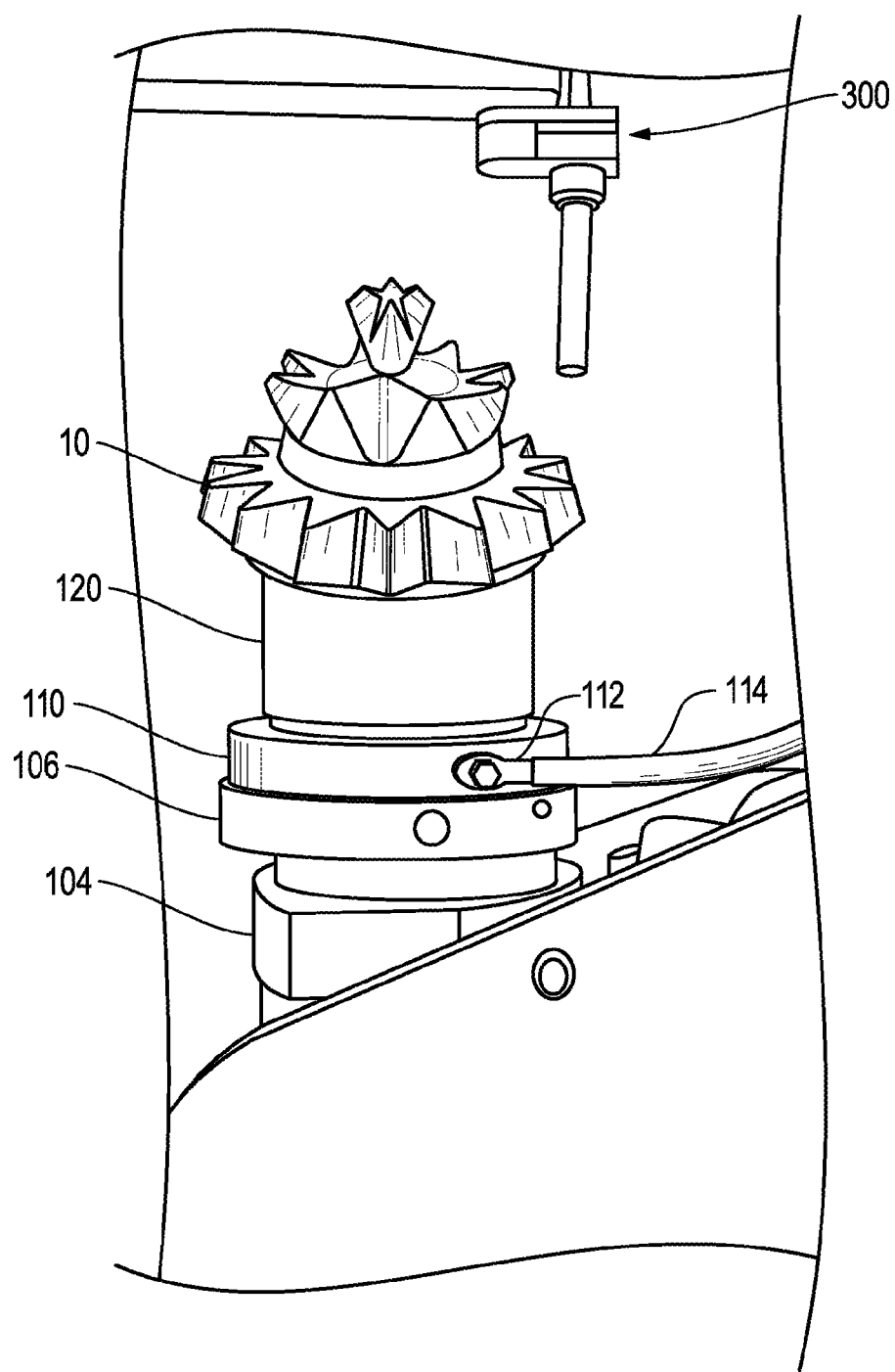
FIG. 7 illustrates an isometric view of a cutter positioned beneath the torch in preparation for the application of hardfacing.

FIGS. 6 and 7 are isometric views of robot 100 shown manipulating cutter 10. Cutter can be seen secured to adapter 110 on distal end 106 of articulated arm 104 of robot 100. As can be seen in FIG. 6 and in FIGS. 13-16, the several axes of rotation 108 provide sufficient degrees of freedom to permit vertical, horizontal, inverted, and rotated positioning of any tooth 20 of cutter 10 directly beneath torch 300. FIG. 7 is illustrated cutter 10 positioned beneath torch 300 in preparation for the application of hardfacing 38.

In the preferred embodiment, adapter 110 is aligned by indicator with articulated arm 104. Adapter 110 is aligned to run substantially true with a programmable axis of movement of robot 100. A chuck 120 is attached to adapter 110 and indicator aligned to within 0.005" of true center rotation. Cutter 10 is held securely by chuck 120 and also centered by indicator alignment. In the preferred embodiment, cutter 10 has grooves that permit location and calibration of the end of torch 300. Torch 300 electrode 304 is then used to align cutter 10 about the z-axis of rotation of cutter 10 by robot 100.

As seen in FIG. 7, electrical ground cable 114 is electrically connected to adapter 110 by ground connector 112 (see FIG. 7). In a preferred embodiment, ground connector 112 is a rotatable sleeve connector. In another preferred embodiment, ground connector 112 is a brush connector. In another preferred embodiment, ground cable 114 is supported by a tool balancer (not shown) to keep it away from the heat of cutter 10 and the welding arc during hardfacing operations. Chuck 120 is attached to adapter 110. Cutter 10 is held in place by chuck 120.

As the present invention necessitates manipulation of heavy cutters 10 in vertical, horizontal, inverted, and rotated positioning beneath torch 300, highly secure attachment of cutter 10 to robot 100 is required for safety and accuracy of the hardfacing operation. Precision alignment of cutters 10 in relation to chuck 120 is also necessary to produce a quality hardfacing and to avoid material waste.

Figure 8:
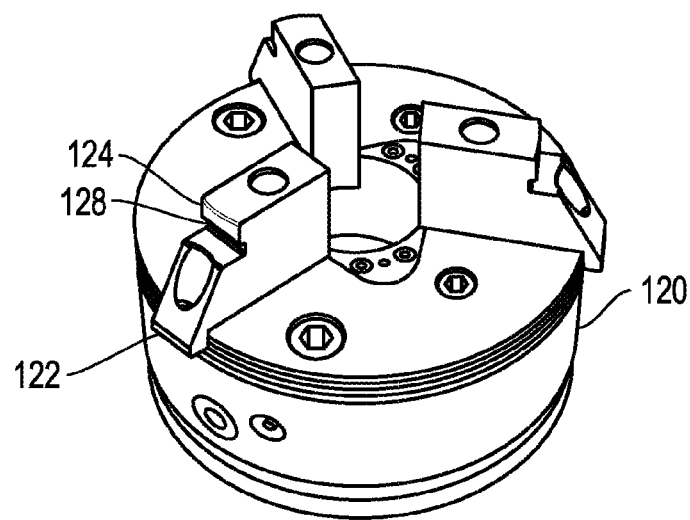
FIG. 8 illustrates an isometric view of a chuck of the preferred type attached to the end of the robot.

FIG. 8 is an isometric view of chuck 120. In the preferred embodiment, chuck 120 is a three-jaw chuck having adjustable jaws 122 for gripping a hollow interior of cutter 10. In another preferred embodiment, jaws 122 are specially profiled to include a cylindrical segment shaped journal land 124 which contacts journal race 40 on cutter 10, providing highly secure attachment of cutter 10 on chuck 120 of robot 100. A seal relief 128 is provided to accommodate a seal supporting surface on cutter 10

Figure 9:
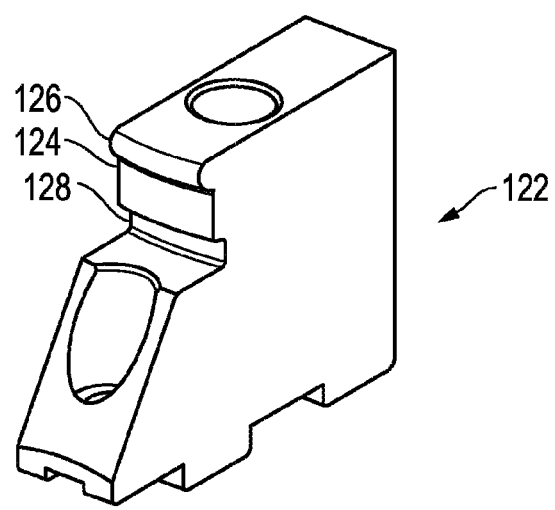
FIG. 9 illustrates an isometric view of a jaw for a three-jaw chuck specially profiled to include a journal land and a race land for gripping a rolling cutter.

In a more preferred embodiment illustrated in FIG. 9, jaws 122 are specially profiled to include a semi-torus shaped race land 126 above journal land 124. In this configuration, journal land 124 fits in alignment with journal race 40 and race land 126 fits in alignment with ball race 42, providing precise alignment against the centerline of ball race 42 and secure attachment of cutter 10 on chuck 120 of robot 100. Seal relief 128 may be provided to accommodate a seal supporting surface on cutter 10.

Figure 10:
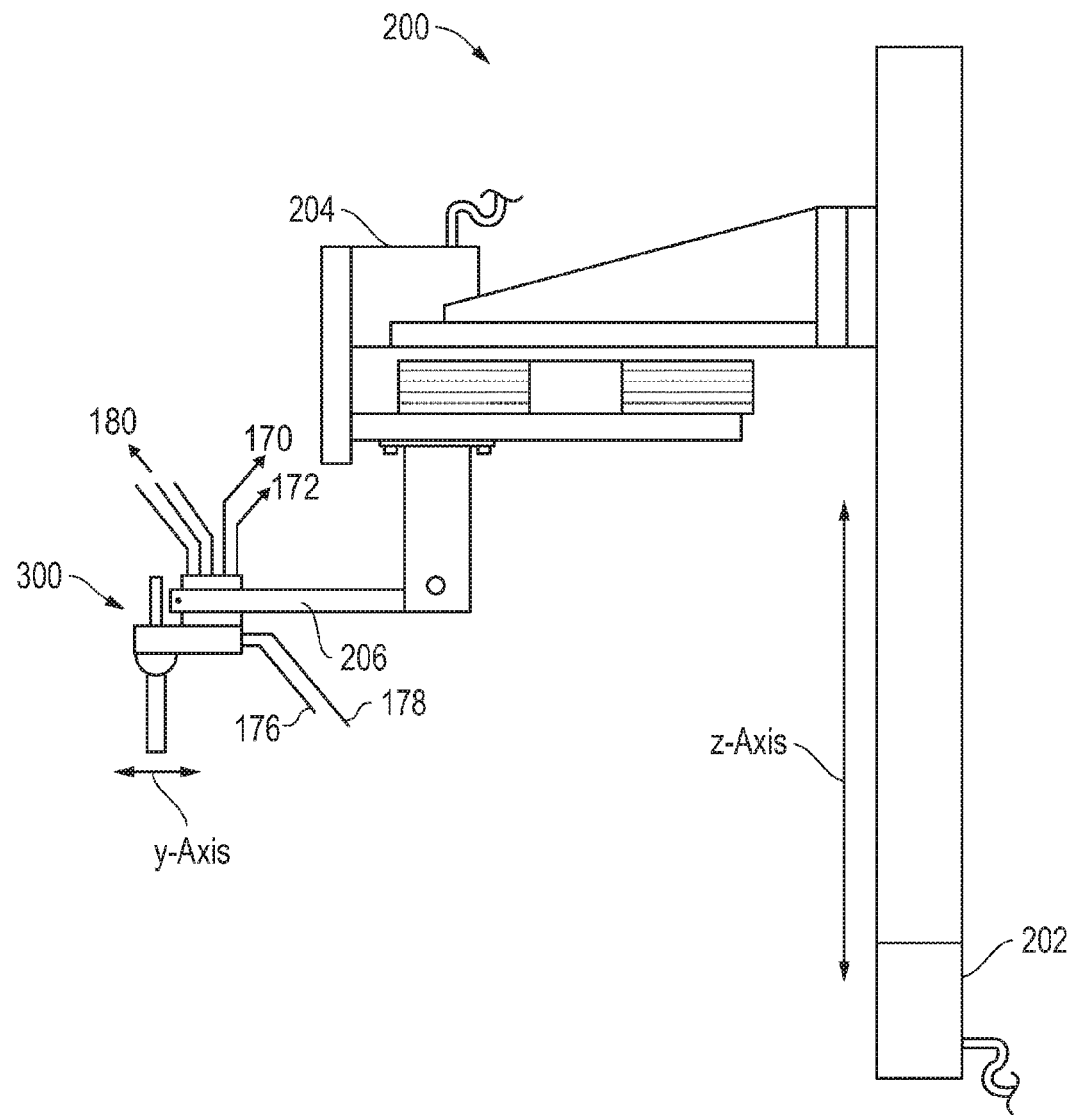
FIG. 10 illustrates a schematic side view of positioner 200 and torch 300.

FIG. 10 illustrates a schematic side view of positioner 200 and torch 300. As illustrated, positioner 200 has a clamp 206 for holding torch 300 in a secure and substantially vertical orientation. Vertical drive 202 provides controlled movement of torch 300 along the z-axis. Horizontal drive 204 provides controlled movement of torch 300 along the y-axis. In combination, drives 202 and 204 provide controlled movement of torch 300 on a vertical plane. Drives 202 and 204 are electrically connected to PLC 150.

In the preferred embodiment, drive 204 oscillates torch 300 along the horizontal y-axis in response to PLC 150 for programmed application of a wide-path bead of hardfacing 38 on the surface of teeth 20 of cutter 10. Also in the preferred embodiment, drive 202 moves torch 300 along the vertical z-axis in real-time response to measured changes in the voltage or current between torch 300 and cutter 10. These occasional real-time distance adjustments maintain the proper energy level of the transferred arc between torch 300 and cutter 10.

Gas dispensing system 180 is connected by piping or tubing to torch 300 for the delivery of transport gas, plasma gas and shielding gas. Hardfacing powder is delivered to torch 300 within the stream of flowing transport gas which receives the hardfacing powder from powder dosage system 160. Torch 300 is electrically connected to pilot arc power source 170 and main arc power source 172.

Suitable and exemplary hardfacing powder materials for use with the methods, apparatus, and systems of present disclosure include, but are not limited to, those selected from the group generally consisting of nickel-based, cobalt-based, stainless steel-based, and iron-based materials and alloys, such as those materials available from Isotec (Staasdorf, Austria), Deloro Stellite Group (Houston, Tex.), Haynes International, Inc. (Kokomo, Ind.), and the Eaton Corporation (Cleveland, Ohio), any of which may further and optionally be blended with a porosity reducing agent, which may be either a "getter" or a "solubility improver", or both. The term "porosity reducing agent" is intended to mean a "getter", which is an element or compound that combines with oxygen or nitrogen or other gaseous elements or compounds to form solid compounds, while the term "solubility improver" is meant to refer to one or more elements or compounds that can increase the amount of gases that can be dissolved in the molten weld metal before forming porosity. The getter is characterized by a higher thermodynamic affinity for gases in the molten weld pool, particularly oxygen and nitrogen, than the principal elements of the hardfacing powder. The solubility improver may be characterized by improving the solubility of the molten weld metal so that it may dissolve a greater content of gases, particularly oxygen and nitrogen, before forming porosity. In accordance with aspects of the present disclosure, both the getter and solubility improver are selected from the group consisting of aluminum, titanium, silicon, manganese, niobium, zirconium, lithium, vanadium, hafnium, yttrium, sodium, calcium, rare earths, noble metals, transition metals, and master alloys thereof. A master alloy is defined herein as an alloy rich in one or more of the foregoing group members. The hardfacing powder suitable for use herein may also include, in addition to the one or more metallic components, one or more non-metallic components, and one or more carbides. The carbide may include a primary carbide composition and, optionally, a secondary carbide composition. The primary carbide composition typically includes one or more of sintered tungsten carbide (e.g., WC/Co), cast tungsten carbide (i.e., eutectic $WC/W_2C$), and macro-crystalline or single crystal tungsten carbide (i.e., WC). The secondary carbide composition may include one or more of vanadium carbide (VC), chromium carbide (i.e., $Cr_3C_2$, $Cr_7C_3$, or $Cr_{23}C_6$), and titanium carbide (i.e., TiC), without limitation. In addition, borides, such as CrB, $TiB_2$ and $ZrB_2$, may be included if desired. In other embodiments, macro-crystalline tungsten carbide (WC) may be replaced by vanadium carbide (VC), as appropriate.

Figure 11:
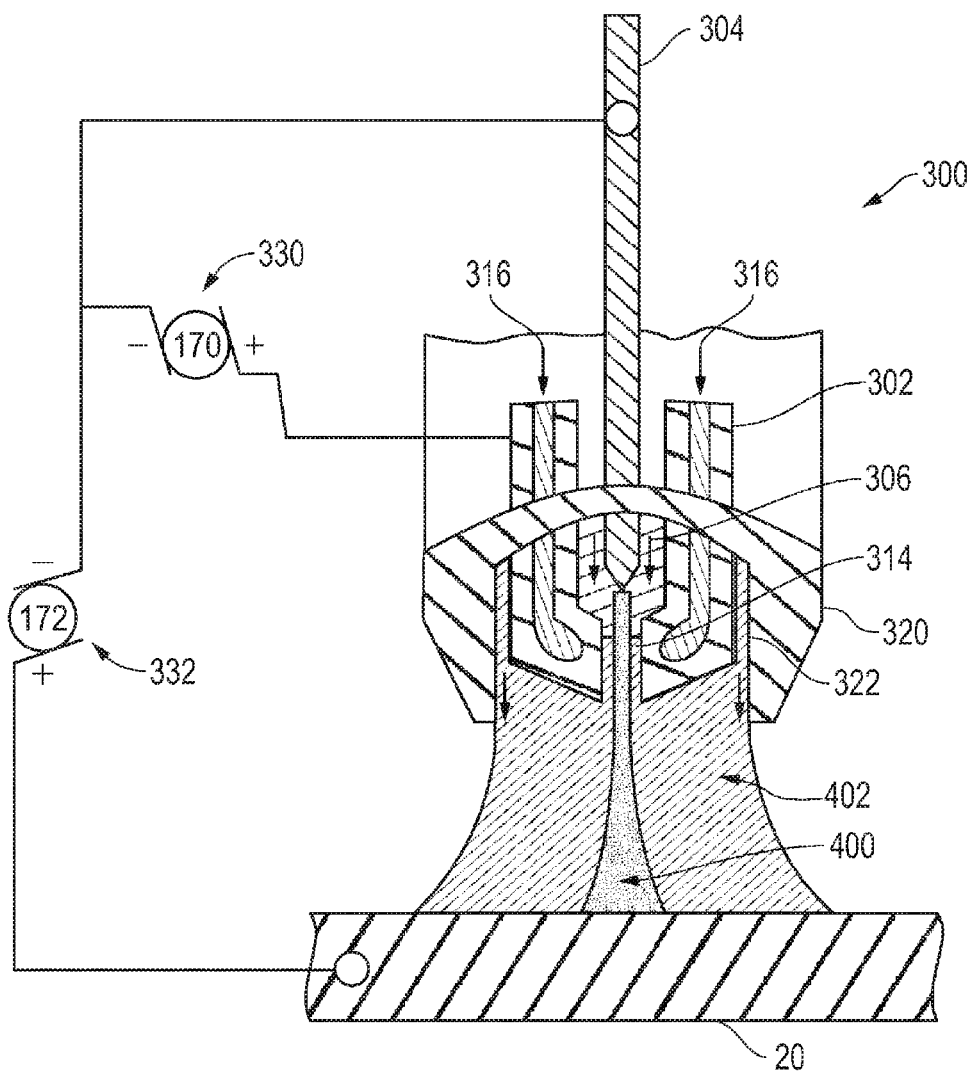
FIG. 11 illustrates a schematic cross-section of torch 300.

FIG. 11 is a schematic cross-section of torch 300. In accordance with the embodiment shown, torch 300 is a Plasma Transferred Arc (PTA) torch 300, such as the Eutectic E52 torch. Torch 300 includes a nozzle 302. A non-burning tungsten electrode (cathode) 304 is centered in nozzle 302 and a nozzle annulus 306 is formed between nozzle 302 and electrode 304. Nozzle annulus 306 is connected to plasma gas source 186 to allow the flow of plasma between nozzle 302 and electrode 304. A restricted orifice 314 accelerates the flow of plasma gas exiting nozzle 302. In this embodiment, nozzle annulus 306 is connected to powder dosage system 160, which supplies hardfacing powder carried by transport gas to nozzle annulus 306.

Electrode 304 is electrically insulated from nozzle 302. A pilot arc circuit 330 is electrically connected to pilot arc power source 170 (FIG. 5), and electrically connects nozzle 302 to electrode 304. A main arc circuit 332 is electrically connected to main arc power source 172 (FIG. 5), and electrically connects cathode 304 to the anode work piece, cutter 10. An insulator separates pilot arc circuit 330 and main arc circuit 332. A cooling channel 316 is provided in nozzle 302 for connection to a pair of conduits 176, 178 that circulate cooling fluid from cooling unit 174 (FIG. 5).

A cup 320 surrounds nozzle 302. Nozzle 302 is electrically insulated from cup 320. A cup annulus 322 is formed between cup 320 and nozzle 302. Cup annulus 322 is connected to shielding gas source 190 to allow the flow of shielding gas between cup 320 and nozzle 302.

In a preferred embodiment, a small, non-transferred pilot arc burns between non-melting (non-consumable) tungsten electrode 304 (cathode) and nozzle 302 (anode). A transferred arc burns between electrode 304 (cathode) and cutter 10 (anode). Electrode 304 is the negative pole and cutter 10 is the positive pole. Pilot arc circuit 330 is ignited to reduce the resistance to an arc jumping between cutter 10 and electrode 304 when voltage is applied to main arc circuit 332. In the preferred embodiment, a ceramic insulator separates circuits 330 and 332.

Plasma Transferred Arc (PTA) welding is similar to Tungsten Inert Gas (TIG) welding. Torch 300 is supplied with plasma gas, shielding gas, and transport gas, as well as hardfacing powder. Plasma gas from plasma gas source 186 is delivered through nozzle 302 to electrode 304. The plasma gas exits nozzle 302 through orifice 314. When amperage from main arc circuit 332 is applied to electrode 304, the jet created from exiting plasma gas turns into plasma. In the preferred embodiment, plasma gas source 186 is comprised of 99.9% Argon.

Shielding gas from shielding gas source 190 is delivered to cup annulus 322. As the shielding gas exits cup annulus 322 it is directed towards the work piece, cutter 10. The shielding gas forms a cylindrical curtain surrounding the plasma column, and shields the generated weld puddle from oxygen and other chemically active gases in the air. In the preferred embodiment, shielding gas source 190 is 95% Argon and 5% Hydrogen.

Transport gas source 182 is connected to powder dosage system 160. Powder dosage system 160 meters hardfacing powder through a conduit connected to nozzle 302 at the proper rate for deposit. The transport gas from transport gas source 182 carries the metered powder to nozzle 302 and to the weld deposit on cutter 10.

Figure 12:
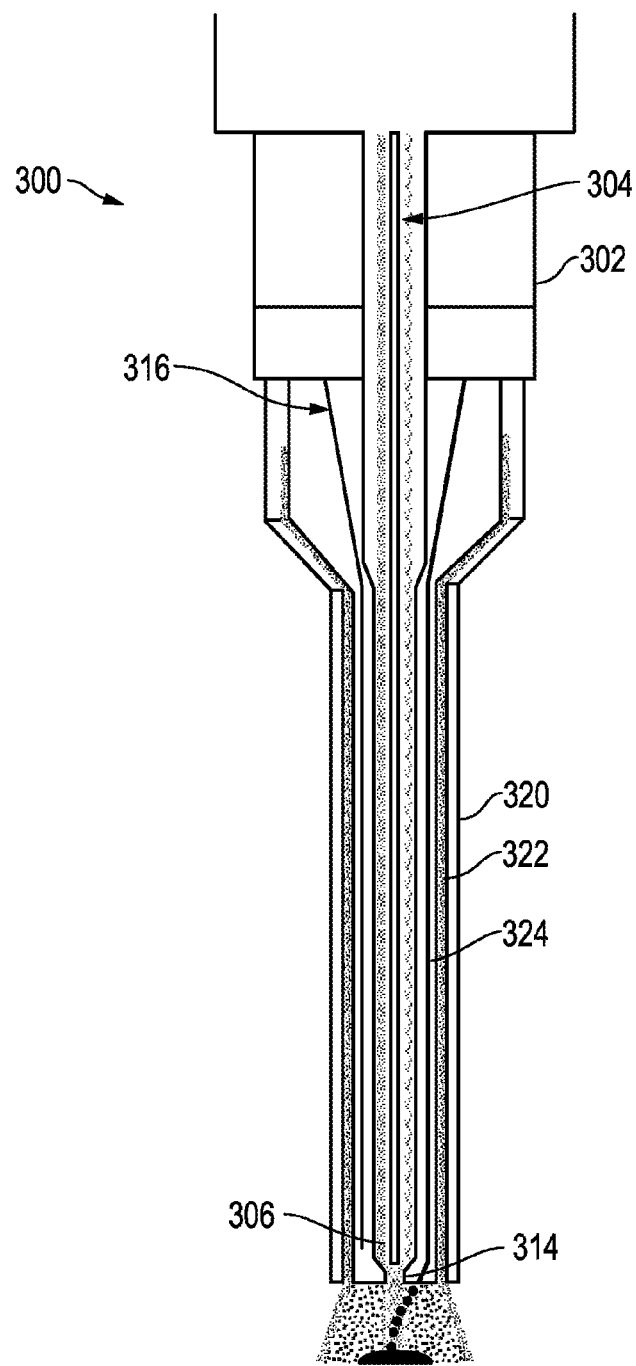
FIG. 12 illustrates a cross-section of a torch configured in accordance with a preferred embodiment.

FIG. 12 is a cross-section of torch 300 configured in accordance with a preferred embodiment. In this preferred embodiment, gas cup 320 of torch 300 has a diameter of less than 0.640 inches and a length of less than 4.40 inches. In the preferred embodiment, nozzle 302 (anode) of torch 300 is made of copper and is liquid cooled. One such torch that is suitable for use with the methods and systems described herein and which is commercially available is the Eutectic E52 torch available from Castolin Eutectic Group (Gutenbergstrasse 10, 65830 Kriftel Germany).

In the preferred embodiment, gas cup 320 is modified from commercially available gas cups for use with torch 300. In a preferred embodiment, gas cup 320 extends beyond nozzle 302 by no more than approximately 0.062 inches. In an embodiment suited for use with the E52 torch, gas cup 320 has an overall length of approximately 4.375 inches. As seen in the embodiment, transport gas and powder are delivered through a transport port 324 in nozzle 302. In the preferred embodiment, an insulating material is attached to the exterior of gas cup 320 of the torch 300. This tends to prevent short-circuiting and damage to torch 300.

The preferred embodiment of shielding gas cup 320 described above is specially designed to improve shield gas coverage of the melt puddle and reduce porosity. This change permits changing the orientation of gas cup 320 to nozzle (anode) 302 and reduction of shielding gas flow velocity. This combination significantly reduces porosity that results from attempts to use presently available commercial equipment to robotically apply hardfacing 38 to steel-tooth cutters 10.

Operation of the Invention

Some of the problems encountered in the development of robotic hardfacing included interference between the torch and teeth on the cutter, short circuiting the torch, inconsistent powder flow, unsustainable plasma column, unstable puddle, heat buildup when using conventional welding parameters, overheated weld deposits, inconsistent weld deposits, misshaping of teeth, and other issues. As a result, extensive experimentation was required to reduce the present invention to practice.

As described above, the present invention begins with inverting what has been the conventional practice since hardfacing of cutters was introduced several decades ago: that is, the practice of maintaining cutter 10 generally stationary and moving torch 300 all over it at various angles as necessary. Fundamental to the present invention, torch 300 is held substantially vertical, while cutter 10 is held by chuck 120 of robotic arm 104 and manipulated beneath torch 300. If torch 300 is robotically manipulated in varying and high angular positions relative to vertical, hardfacing powder in torch 300 will flow unevenly and cause torch 300 to become plugged. In addition to plugging torch 300, even flow of hardfacing powder is critical to obtaining a consistent quality bead of hardfacing material on cutter 10. Thus, deviation from a substantially vertical orientation is avoided.

As the terms are used in this specification and claims, the words "generally" and "substantially" are used as descriptors of approximation, and not words of magnitude. Thus, they are to be interpreted as meaning "largely but not necessarily entirely."

Accordingly, a rolling cutter 10 is secured to distal end 106 of robot arm 104 by chuck 120 and adapter 110. Cutter 10 is grounded by ground cable 114 which is attached to adapter 110 at ground connector 112. Providing an electrical ground source near distal end 106 of robot 100 is necessary, since using robot 100 in the role-reversed manner of the present invention (holding the anode work piece) would otherwise result in the destruction of robot 100 by arc welding the rotating components of the movable axes together.

Robot arm 104 moves in response to program control from robot controller 130 and (or) PLC 150. As stated, torch 300 is mounted to positioner 200 having two controllable axes in a substantially vertical plane. As previously mentioned, a physical indicator, such as a notch or groove, may be formed on cutter 10 to be engaged by torch 300 to insure proper initial orientation between torch 300, robot arm 100, and cutter 10. Additionally, at least one position indicator is electrically connected to PLC 150 for determining location and orientation of cutter 10 to be hardfaced relative to robot 100.

After initial orientation and positioning, transfer, plasma and shielding gas are supplied to torch 300 by their respective sources 182, 186, 190 through their respective controllers 184, 188, 192.

Torch 300 is ignited by provision of current from pilot arc power source 170 and main arc power source 172. Igniting pilot arc circuit 330 reduces the resistance to an arc jumping between cutter 10 and electrode 304 when voltage is applied to main arc circuit 332.

Flow of hardfacing powder is provided by powder dosage system 160 dispensing controlled amounts of hardfacing powder into a conduit of flowing transport gas from transport gas source 182, having a flow rate controlled by flow controller 184. Then relative movement, primarily of cutter 10 relative to torch 300, as described above and below is obtained by movement of robot arm 100 and positioner 200, permitting automated application of hardfacing 38 to the various selected surfaces of cutter 10 in response to programming from robot controller 130 and PLC 150.

An imaging sensor 142 may be provided for identifying specific cutters 10 and (or) parts of cutters 10 to be hardfaced. A laser sensor 142 may also or alternatively be provided for determining proximity of torch 300 to cutter 10 and tooth 20, and/or to measure thickness of applied hardfacing 38. Positioning and other programming parameters are correctable based on sensor 142 data acquisition and processing.

Robot controller 130 is primarily responsible for control of robot arm 100, while PLC 150 and data recorder 190 provide sensor 142 data collection and processing, data analysis and process adjustment, adjustments in robot 100 movement, torch 300 oscillation, and torch 300 operation, including power, gas flow rates and material feed rates.

Figure 13:
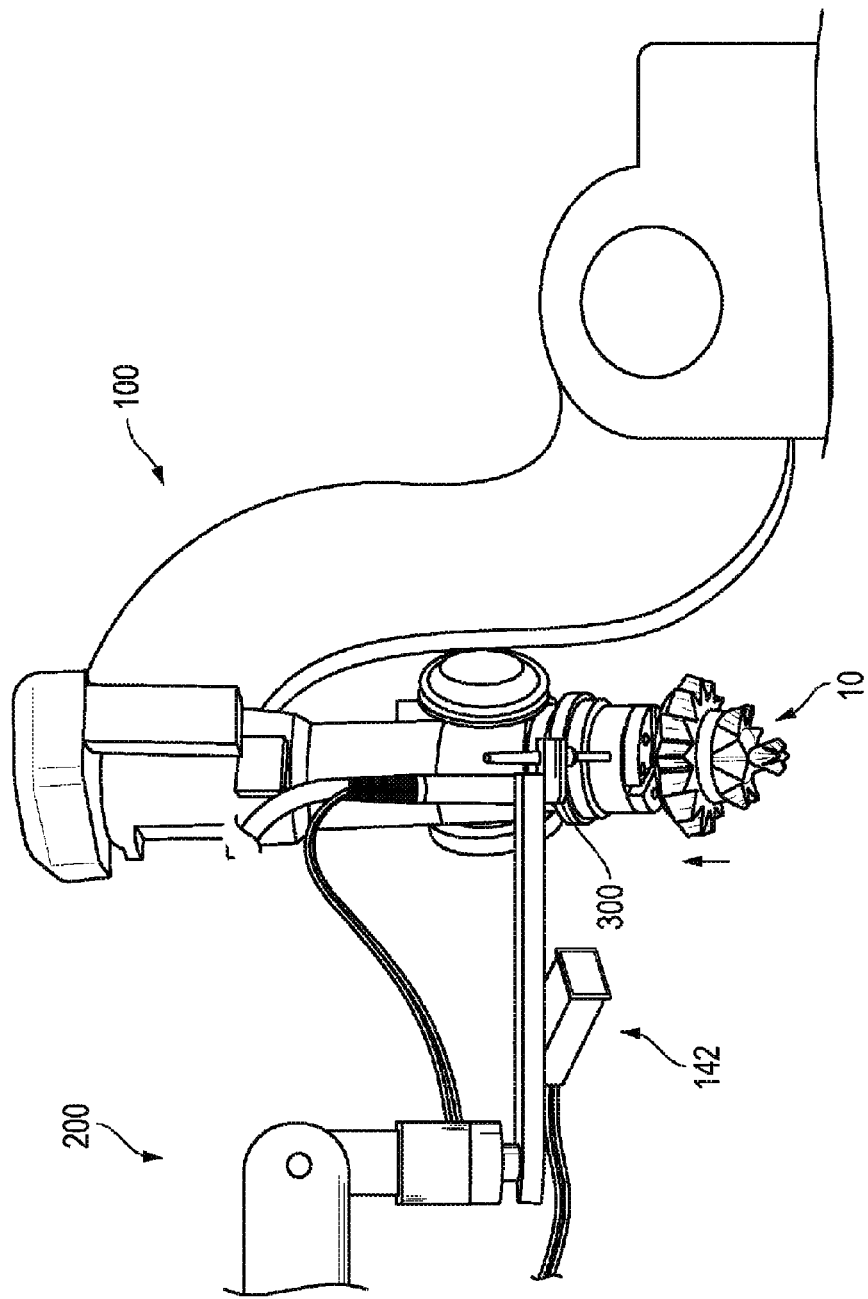
FIG. 13 illustrates an isometric view illustrating the robot manipulating a rolling cutter into position in preparation of the application of hardfacing to the outer ends of the teeth.
Figure 14:
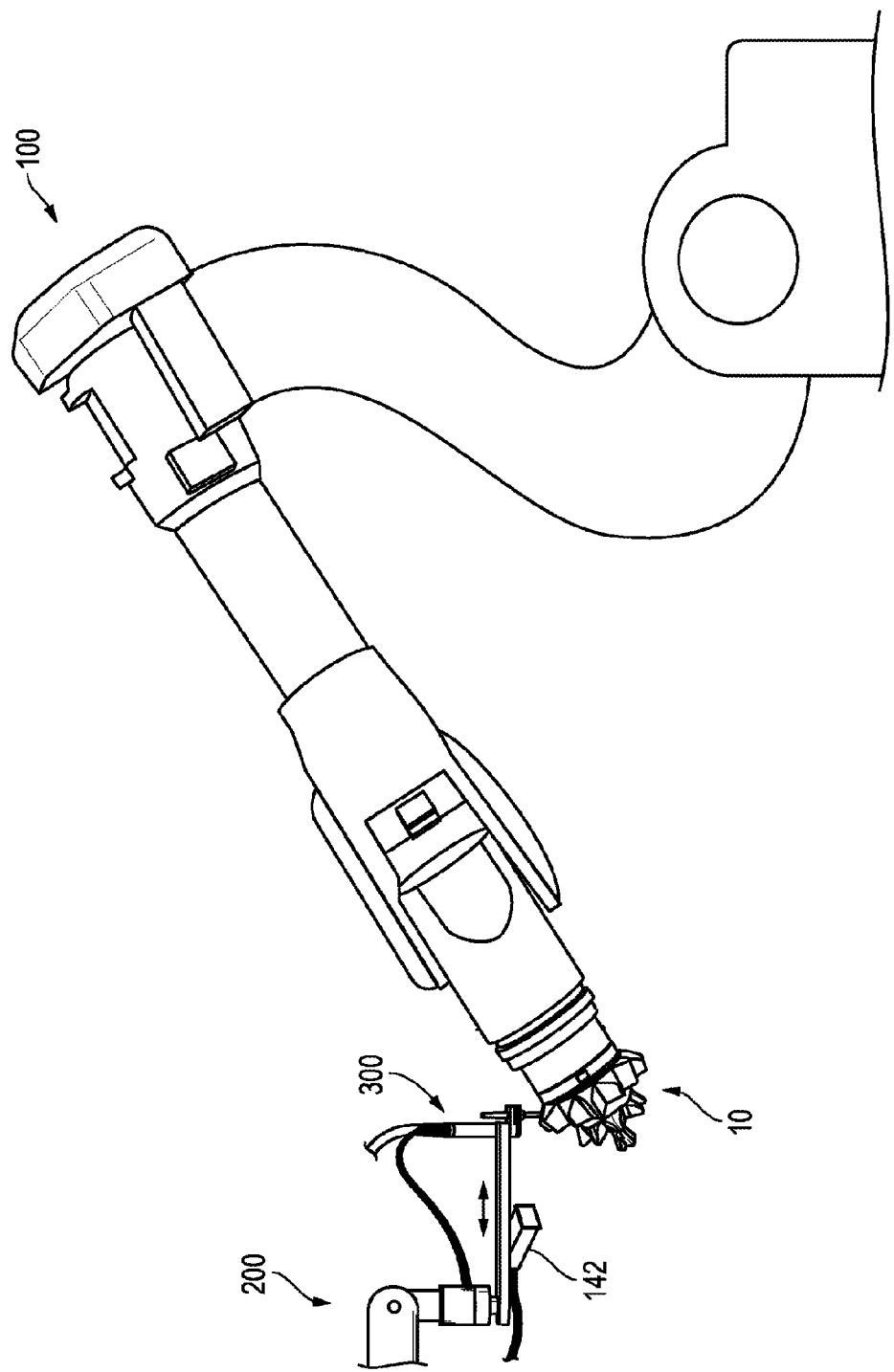
FIG. 14 illustrates a side view illustrating torch 300 applying hardfacing to the outer end of a tooth on the outer row of the cutter.
Figure 15:
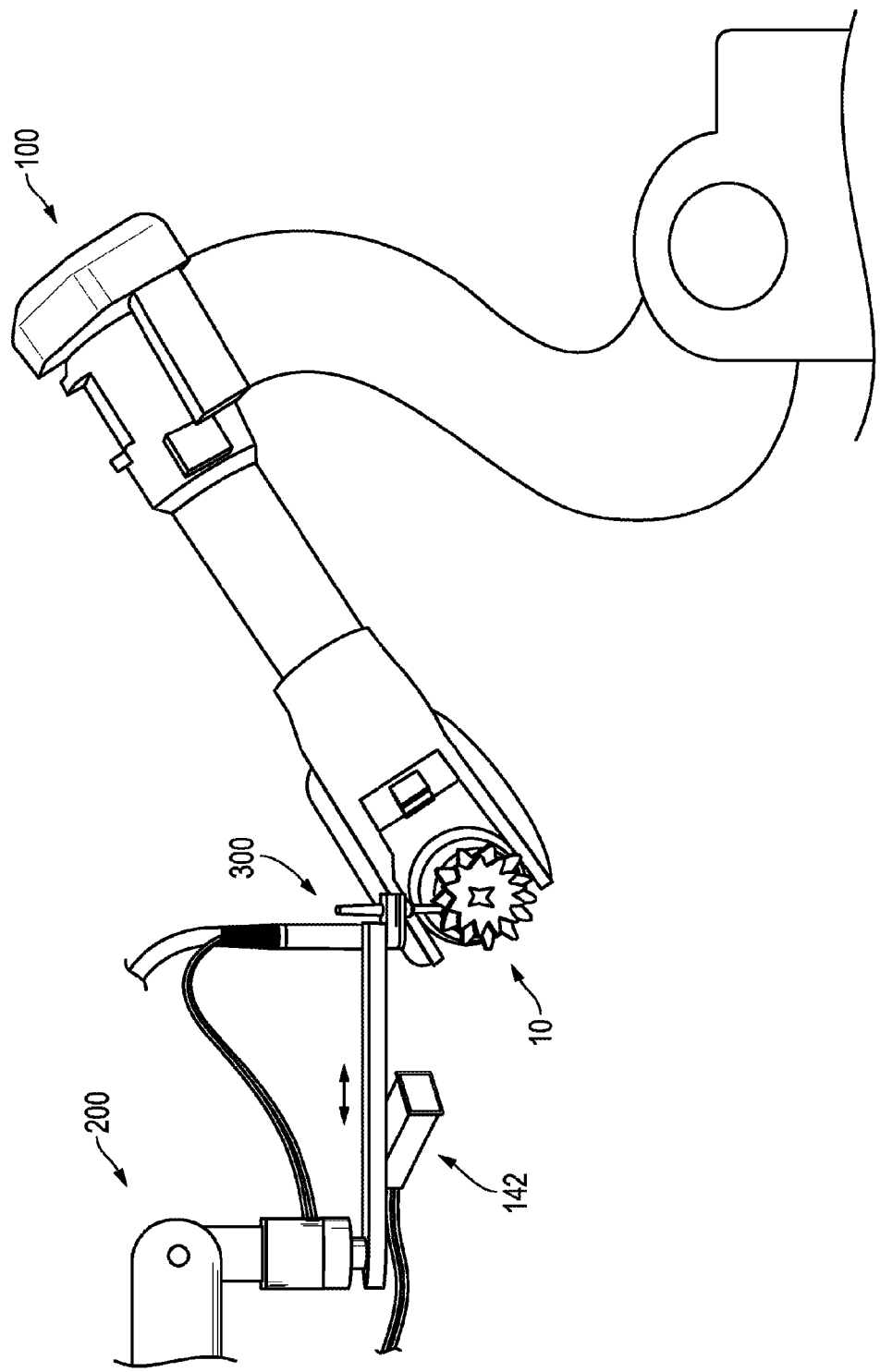
FIG. 15 illustrates a side view illustrating torch 300 applying hardfacing to the leading flank of a tooth on the outer row of the cutter.
Figure 16:
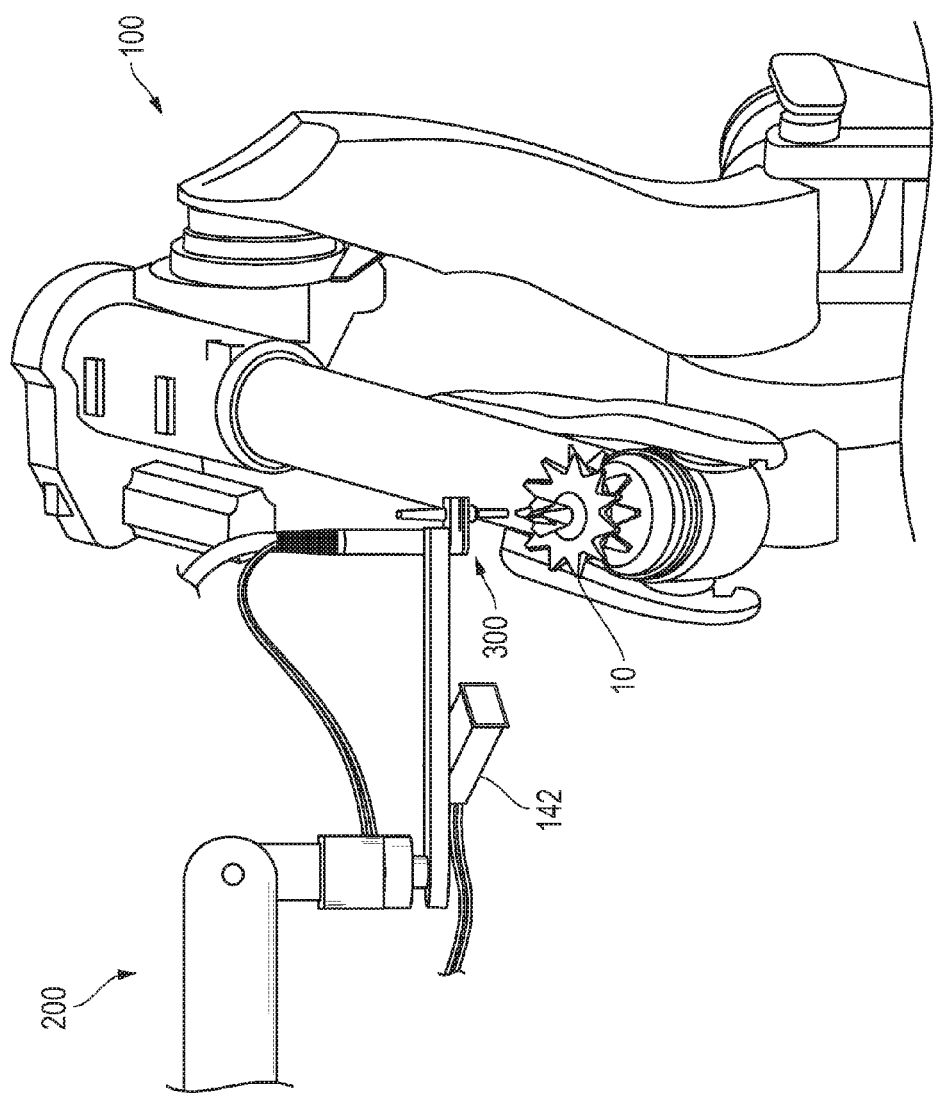
FIG. 16 illustrates an isometric view illustrating the robot manipulating a rolling cutter into position in preparation of the application of hardfacing to the inner end of a tooth on the cutter.

FIGS. 13 and 14 illustrate robot 100 manipulating rolling cutter 10 into position to apply hardfacing material to outer 28 of teeth 20 on outer row 16 of cutter 10. FIG. 15 is illustrates torch 300 in position to apply hardfacing to leading flank 22 or trailing flank 24 of tooth 20 on outer row 16 of cutter 10. FIG. 16 is an isometric view illustrating robot 100 manipulating rolling cutter 10 into position in preparation for application of hardfacing 38 to inner end 30 of tooth 20.

As can be seen in FIG. 6 and in FIGS. 13-16, several axes of rotation 108 of robot arm 100 provide sufficient degrees of freedom to permit vertical, horizontal, inverted, and rotated positioning of cutter 10 beneath torch 300, allowing torch 300 to access the various surfaces of cutter 10 while maintaining torch 300 in a substantially vertical position. In addition to providing a system and apparatus that addresses the realities of automated application of hardfacing to the complex surfaces of rolling cutters, the present invention provides a method or pattern of application of the hardfacing material to the cutters that is adapted to take advantage of the precisely controlled relative movement between torch 300 and cutter 10 made possible by the apparatus of the present invention. These patterns will be described with reference to FIGS. 17 through 25 below.

The above-described apparatus has resolved these issues and enabled development of the novel and unique method of applying hardfacing of the present invention. A preferred embodiment of the present invention includes a hardfacing pattern created by superimposing a first waveform path onto a second waveform path.

FIG. 17 is a bottom view of typical steel-tooth 20 such as might be located on steel-tooth cutter 10, illustrating a first waveform target path 50 defined in accordance with a preferred embodiment of the present invention. Tooth 20 has an actual or approximate included angle θ. Vertex 36 of included angle θ lies on centerline 34 of tooth 20. Centerline 34 extends through crest 26 and base 32.

In the preferred embodiment illustrated, target path 50 traverses one surface of tooth 20. By way of example, outer end surface 28 is shown, but the embodiment illustrated applies to all surfaces of tooth 20. Target path 50 has numerous features. Target path 50 may begin with a strike path 52 located near crest 26. The various surfaces of teeth 20 are preferably welded from nearest crest 26 towards base 32 when possible to control heat buildup.

Thereafter, target path 50 traverses the surface of tooth 20 in parallel paths while progressing in the direction of base 32. Target path 50 is comprised of traversing paths 54, which cross centerline 34, are alternating in direction, and generally parallel to crest 26.

Step paths 56 connect traversing paths 54 to form continuous target path 50. Step paths 56 are not reversing, but progressing in the direction of base 32. Step paths 56 are preferably generally parallel to the sides of the surface being hardfaced. As such, step paths 56 are disposed at an angle of approximately θ/2 to centerline 34. Taken together, traversing paths 54 and step paths 56 form target path 50 as a stationary, generally trapezoidal waveform about centerline 34, having increasing amplitude in the direction of base 32.

In the preferred embodiment, the amperage of torch 300 is applied in proportion to the length of traversing path 54. This permits generation of a good quality bead definition in hardfacing 38. In the preferred embodiment, this is obtained by starting at the lowest amperage on path 54 nearest to crest 26 of tooth 20, and increasing the amperage in proportion to the length of traversing path 54 where hardfacing 38 is being applied.

In another preferred embodiment, amperage and powder flow are increased as hardfacing 38 is applied to crest 26. This results in increased height of the automatically welded crests 26 to their total design height. In a more preferred embodiment, the programmed traversing paths 54 for flanks 22 and 24, inner surface 30 and outer surface 28 are also modified such that to overlap crests 26 sufficiently to create the desired profile and to provide sufficient support to crests 26.

In the preferred embodiment, the program sequence welds the surface of a datum tooth, then offsets around the cutter axis the amount needed to align with the next tooth surface. Also in the preferred embodiment, teeth are welded from the tip to the root to enhance heat transfer from the tooth and prevent heat buildup. In a more preferred embodiment, welding is alternated between rows of teeth on the cutter to further reduce heat buildup.

FIG. 18 is a schematic representation of the oscillation of torch 300. In this illustration, x-y defines a horizontal plane. Torch 300 is movable in the z-y vertical plane perpendicular to the x-y plane. The y-axis is the axis of oscillation ("AO"). Torch 300 is oscillated along the AO. The oscillation midpoint is identified as OM. Oscillation of torch 300 is controlled by instructions from programmable logic controller 150 provided to horizontal drive 204 of positioner 200. In the preferred embodiment, torch 300 has a linear velocity of between about 1 and 10 mm per second along its axis of oscillation AO.

FIG. 19 is a schematic representation of a second waveform torch path 60 formed in accordance with a preferred embodiment of the present invention. In the preferred embodiment, hardfacing is applied to a tooth 20 by oscillating torch 300 while moving cutter 10 on target path 50 beneath torch 300. In this manner, hardfacing is applied by superimposing the waveform of torch path 60 onto the waveform of target path 50. By superimposing torch path 60 onto target path 50, a superior hardfacing pattern is created. More specifically, the superimposed waveform generates a uniform and continuous hardfacing bead, is properly defined, and efficiently covers the entire surface of tooth 20 with the desired thickness of material and without excessive heat buildup.

As used throughout herein, the terms "waveform," "trapezoidal waveform" and "triangular waveform" are not intended to be construed or interpreted by any resource other than the drawings and description provided herein. More specifically, they are used only as descriptors of the general path shapes to which they have been applied herein.

As seen in FIG. 19, torch path 60 has an amplitude Λ. In the preferred embodiment, Λ is between about 3 mm and 5 mm. In a more preferred embodiment, Λ is about 4 mm. Traversing path 54 is positioned in approximate perpendicular relationship to the axis of torch 300 oscillation, at the oscillation midpoint (OM). The waveform of torch path 60 is formed by oscillating torch 300 while moving cutter 10 along traversing path 54 beneath the OM of torch 300. Thus, traversing path 54 of target path 50 becomes the axis about which the generally triangular waveform of torch path 60 oscillates.

Cutter 10 is positioned and moved by instructions from robot controller 130 provided to robot 100. In the preferred embodiment, robot 100 moves cutter 10 to align target path 50 directly beneath the OM. Also in the preferred embodiment, cutter 10 is moved such that the OM progresses along target path 50 at a linear velocity (target path speed) of between approximately 1 and 4 mm per second.

In the preferred embodiment illustrated, a momentary dwell period 68 is programmed to elapse between peaks of oscillation of torch 300. In this embodiment, dwell 68 prevents generally triangular waveform of torch path 60 from being a true triangular waveform. In the preferred embodiment, dwell 68 is between about 0.01 to about 0.6 seconds.

Figure 20:
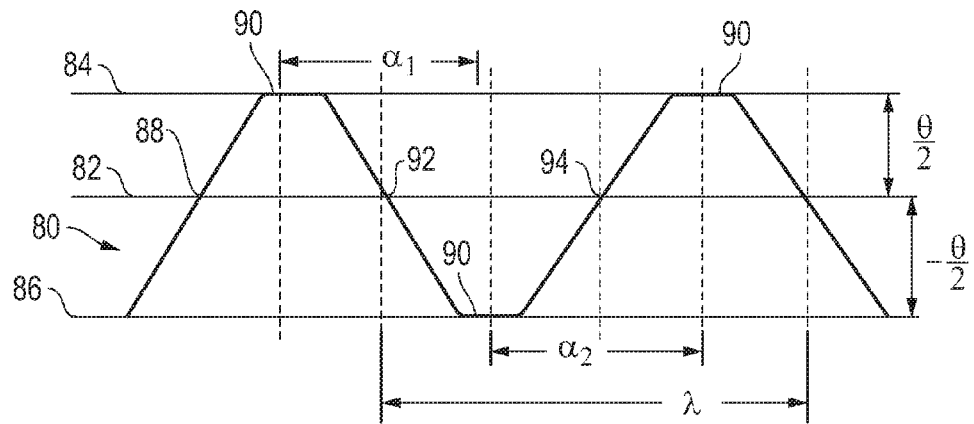
FIG. 20 illustrates a schematic representation of a waveform created by oscillation of the cutter relative to the intersection of the target path and the oscillation midpoint 'OM' in accordance with a preferred embodiment of the present invention.

FIG. 20 is a schematic representation of another preferred embodiment. In this embodiment, a secondary oscillation 80 of traversing path 54 modifies torch path 60. Traversing path 54 is oscillated as a function of the location of oscillation midpoint OM on target path 50. Secondary oscillation 80 is created by gradually articulating cutter 10 between step paths 56 as oscillation midpoint OM of oscillating torch 300 passes over traversing path 54. Each traversing path 54 constitutes ½λ of a wave length of secondary oscillation 80. Since traversing paths 54 are of different lengths, the wavelength of secondary oscillation 80 expands as the hardfacing application progresses towards base 32 of tooth 20. For example, where $α_1$ represents a first traversing path 54 and $α_2$ represents the next traversing path 54, $α_1 < α_2$.

Figure 21:
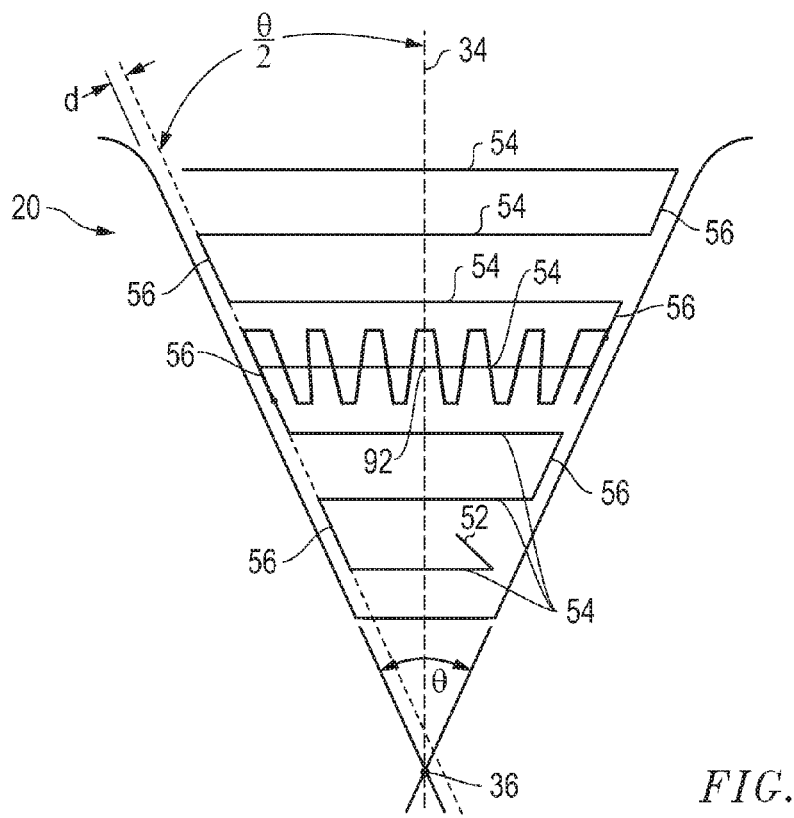
FIG. 21 illustrates a schematic representation of a modified waveform of hardfacing created in accordance with the preferred embodiment of FIG. 20.

FIG. 21 is a bottom view of steel-tooth 20 illustrating traversing paths 54 connected by step paths 56 to form first waveform target path 50. Second waveform torch path 60 is superimposed on target path 50. When secondary oscillation 80 is imparted on traversing path 54, an accordion-like alteration of second waveform torch path 60 results.

Referring to FIG. 20 and FIG. 21, a maximum articulation angle of about |θ/2| of cutter 10 occurs at each step path 56. In an optional embodiment, as oscillation midpoint OM of torch 300 progresses on each step path 56, secondary oscillation 80 is dwelled. This can be done optionally based on prior path (hardfacing) coverage of step path 56. Point 90 in FIG. 20 schematically represents the dwell periods.

As cutter 10 moves along traversing path 54, cutter 10 is gradually articulated by robot 100 until axis of oscillation AO (see FIG. 18) is substantially perpendicular to traversing path 54 at tooth 20 centerline 34. This occurs schematically at point 88 on FIG. 20. As cutter 10 continues to move along traversing path 54, cutter 10 is gradually articulated by robot 100 until step path 56 is again parallel to axis of oscillation AO. This occurs when oscillation midpoint OM arrives at subsequent step path 56. At that point, maximum articulation of θ/2 has been imparted to cutter 10. Oscillation is dwelled at 90 until oscillation midpoint OM arrives at subsequent traversing path 54. Cutter 10 is then gradually articulated back by robot 100 until traversing path 54 is again perpendicular to axis of oscillation AO at tooth centerline 34. This occurs at point 92 in FIG. 20.

Secondary oscillation of cutter 10 continues until subsequent step path 56 is parallel to axis of oscillation AO, when oscillation midpoint OM arrives at subsequent step path 56. At that point, a maximum articulation of −θ/2 has been imparted to cutter 10. Oscillation is again dwelled at 90 until oscillation midpoint OM arrives at subsequent traversing path 54.

Figure 25:
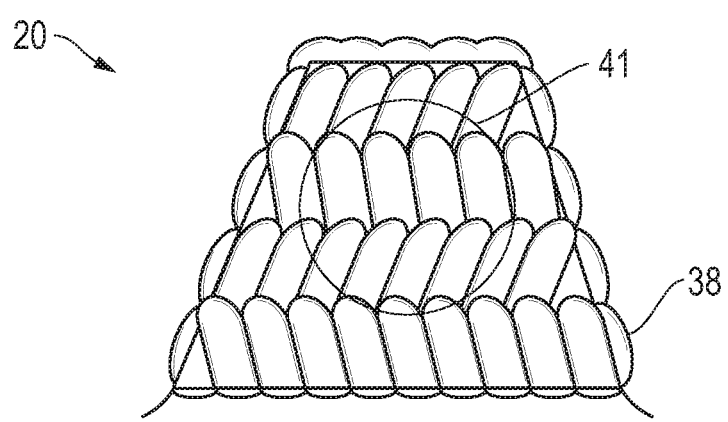
FIG. 25 illustrates a schematic representation of a 'herringbone' pattern of hardfacing applied to a tooth of a cutter, in accordance with a preferred embodiment of the present invention.

In this embodiment, robot 100 rotates cutter 10 a maximum of angle θ/2 at the intersection of traversing path 54 and step path 56, such that step path 56 and the approaching edge of tooth 20 are oriented generally parallel to axis of oscillation AO of torch 300. The waveform of torch path 60 is thus substantially modified as torch 300 approaches each step path 56. The application result is a very efficient and tough 'shingle' pattern 39 of hardfacing 38 near tooth 20 centerline 34. FIG. 25 illustrates a schematic representation of 'shingle' pattern 39.

Optionally, oscillation of cutter 10 may be dwelled when oscillation midpoint OM is near centerline 34 of tooth 20 to obtain a more uniform bead deposition across the width of tooth 20. In the preferred embodiment, step paths 56 are slightly offset from the edge of tooth 20 by a distance "d."

In the preferred embodiment, the path speed of step path 56 may be higher than the path speed of traversing path 54, such that the amount of hardfacing deposited is controlled to provide the desired edge protection for tooth 20. In the preferred embodiment, the length of step path 56 is greater than height Λ, and less than 2Λ. In a preferred embodiment, step path 56 is approximately 5 mm. Thus, in the preferred embodiment, hardfacing deposited on two adjacent traversing paths 54 will overlap. In the preferred embodiment, the length of overlap is about 3 mm. Generating this overlap creates a smooth surface with no crack-like defects.

In another preferred embodiment, cutter 10 is preheated to prevent heat induced stress. When necessary, portions of the welds can be interrupted during processing to minimize and control heat buildup. In the preferred embodiment, crests 26 are formed in three interrupted passes, in which the interruption provides cooling and shape stabilization of the applied material from the previous pass.

Figure 22:
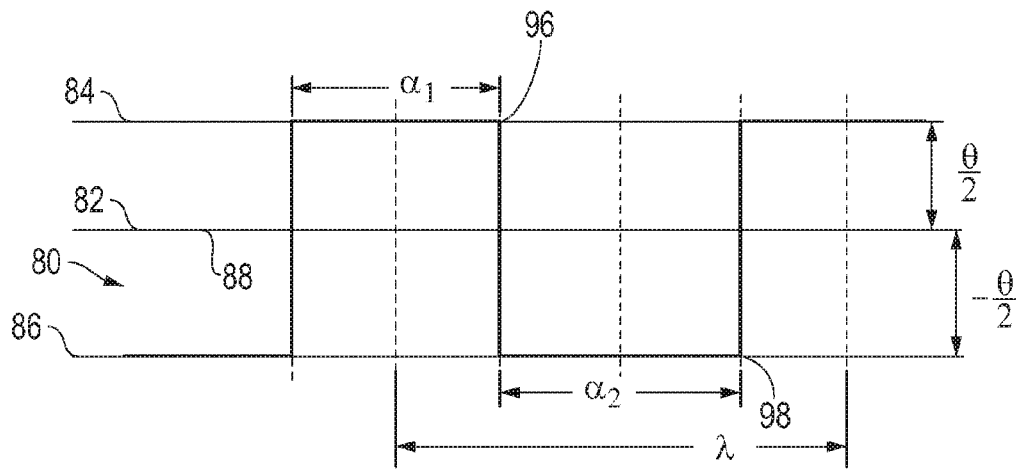
FIG. 22 illustrates a schematic representation of a generally rectangular shaped waveform created by oscillation of the cutter relative to the intersection of the target path and the oscillation midpoint 'OM' in accordance with a preferred embodiment of the present invention.

FIG. 22 is a schematic representation of an alternative preferred embodiment. In this embodiment, secondary oscillation 80 of traversing path 54 again modifies torch path 60. However, in this embodiment, secondary oscillation 80 is created by relatively sudden and complete articulation of cutter 10 at step paths 56 as oscillation midpoint OM of oscillating torch 300 reaches, or nearly reaches, step path 56. Each traversing path 54 constitutes ½λ of a wavelength of secondary oscillation 80. Since traversing paths 54 are of different lengths, the wavelength of secondary oscillation 80 expands as the hardfacing application progresses towards base 32 of tooth 20. For example, where $\alpha_1$ represents a first traversing path 54 and $\alpha_2$ represents the next traversing path 54, $\alpha_1 < \alpha_2$.

Figure 23:
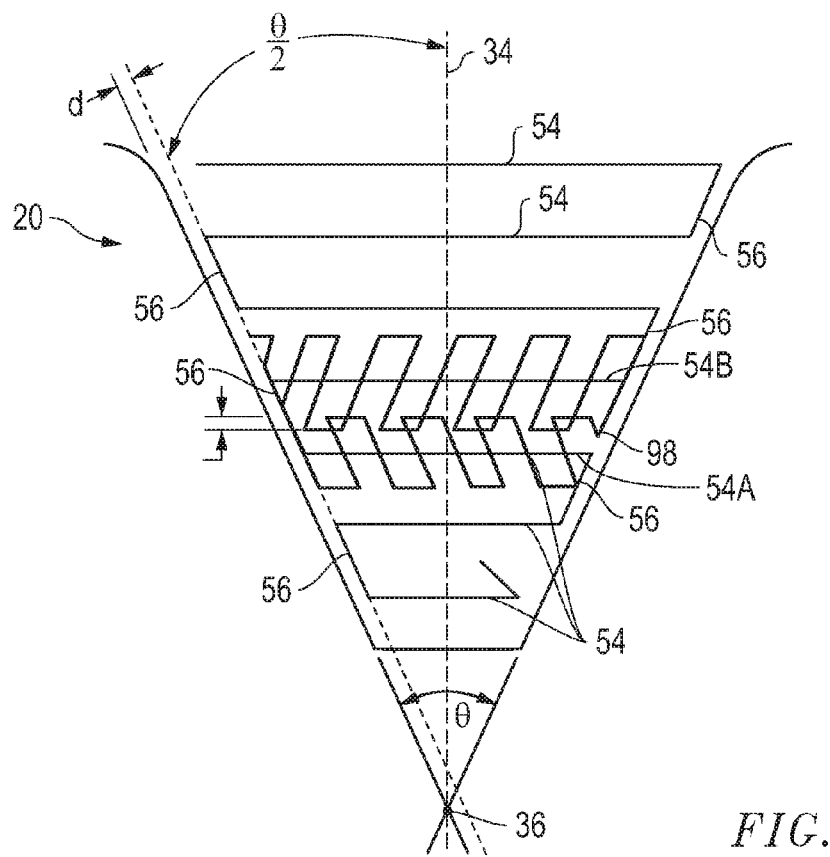
FIG. 23 illustrates a schematic representation of a modified waveform of hardfacing created in accordance with the preferred embodiment of FIG. 22.
Figure 24:
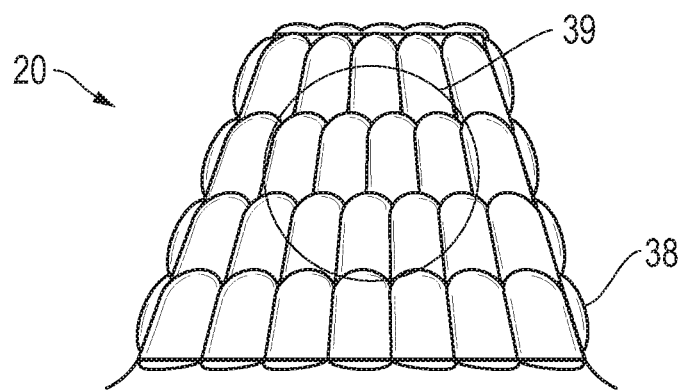
FIG. 24 illustrates a schematic representation of a 'shingle' pattern of hardfacing applied to a tooth of a cutter, in accordance with a preferred embodiment of the present invention.

FIG. 23 is a bottom view of steel-tooth 20 illustrating traversing paths 54 connected by step paths 56 to form first waveform target path 50. Second waveform torch path 60 is superimposed on target path 50. When secondary oscillation 80 is imparted on traversing paths 54, a herringbone pattern of hardfacing 38 is produced on the surface of tooth 20.

Referring to FIG. 22 and FIG. 23, a maximum articulation angle of about |θ/2| of cutter 10 occurs at each step path 56 (as measured from the centerline 34 of tooth 20). In this preferred embodiment, as oscillation midpoint OM of torch 300 progresses on each step path 56, secondary oscillation 80 is dwelled. The dwell periods are schematically represented by the high and low points of waveform 80 in FIG. 22.

As cutter 10 moves along traversing path 54, it is not again articulated by robot 100 until oscillation midpoint OM of torch 300 nears or reaches the subsequent step path 56. This occurs schematically at point 96 on FIG. 22. At this point, cutter 10 is articulated by robot 100 an angular amount θ, aligning subsequent step path 56 substantially parallel to axis of oscillation AO.

In the preferred embodiment, a traversing path 54A will comprise the centerline of a series of parallel columns of hardfacing 38 inclined at an angle to centerline 34 of tooth 20. In the preferred embodiment, the angle is approximately θ/2. Additionally, in the preferred embodiment, traversing row 54A will have an adjacent traversing row 54B comprising the centerline of a series of parallel columns of hardfacing 38, inclined at an angle to centerline 34 of tooth 20, where the angle is approximately −(θ/2). Still more preferred, the hardfacing 38 of traversing path 54A and the hardfacing of traversing path 54B will overlap. The application result is a very efficient and tough 'herringbone' pattern 41 of hardfacing 38 near tooth 20 centerline 34. FIG. 25 is a schematic representation of 'herringbone' pattern 41.

It will be readily apparent to those skilled in the art that the general principles defined herein may be applied to other embodiments and applications without departing from the spirit and scope of the present invention. For example, embodiments of the present disclosure may use a number of hardfacing technique(s), alone or in combination, to achieve suitable hardfacing depositions using the automated methods and systems described herein. For example, the robotic welding systems disclosed herein may include atomic hydrogen welding, oxyacetylene welding, plasma transfer arc ("PTA"), pulsed plasma transfer arc ("PPTA"), gas tungsten arc, shielded metal arc process, laser cladding, or the like, as well as combinations thereof, as appropriate.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A robotic cutter welding system for depositing hardfacing material on steel teeth of a rolling cutter of a rock bit, the welding system comprising:

a torch positioner having program controllable motion in a vertical plane;

a plasma transfer arc torch secured to the torch positioner in a substantially vertical orientation and having a nozzle directed downward;

a plasma gas supply to the torch having an electrically controllable flow valve;

a shielding gas supply to the torch having an electrically controllable flow valve;

a transport gas supply to the torch having an electrically controllable flow valve;

a powder dosage system connected to the transport gas supply;

a robot having a program controllable articulated arm;

a jawed chuck attached to the articulated arm, the chuck securing a rock bit cutter;

at least one sensor for determining the location of a surface of the cutter;

a programmable control system electrically connected to the torch positioner, the torch, the robot, and the sensor; and an imaging sensor electrically connected to the control system;

wherein the robot is programmed to position a surface of the cutter in a substantially horizontal plane below the torch prior to the application of hardfacing material to the cutter; and, wherein the positioner is programmed to oscillate the torch along a substantially horizontal axis.

2. The robotic cutter welding system of claim 1, further comprising:

the positioner being programmed to move the torch in a vertical axis; and, wherein movement of the torch along the vertical axis controls a voltage output of the torch.

3. The robotic cutter welding system of claim 1, further comprising:

an electrically grounded adapter plate attached to the articulated arm, wherein the jawed chuck is attached to the adapter plate.

4. The robotic cutter welding system of claim 3, further comprising:

the jawed chuck having three jaws;

each jaw having a cylindrical segment portion engaging an internal journal race portion of the cutter; and, each jaw having a torus segment portion adapted to receive an internal ball race portion of the cutter.

5. The robotic cutter welding system of claim 1, wherein an adapter plate is aligned to run substantially true with a programmable axis of the robot's movement.

6. The robotic cutter welding system of claim 1, further comprising:

the chuck being aligned by indicator positioning with a tapered flange to rotate within a 0.005" rotational tolerance.

7. The robotic cutter welding system of claim 1, further comprising:

an adapter plate attached to the articulated arm;

the jawed chuck attached to the adapter plate; and, a heat sink provided between the adapter plate and the rolling cutter.

8. The robotic cutter welding system of claim 1, further comprising:

an air gap provided between the cutter and the chuck.

9. The robotic cutter welding system of claim 1, further comprising:

a thermal insulating material attached to the chuck.

10. The robotic cutter welding system of claim 1, further comprising:

the torch having a shielding gas cup surrounding an anode; and, the shielding gas cup having a diameter of less than 0.640 inches.

11. The robotic cutter welding system of claim 1, further comprising:

an imaging sensor directed to an area of the tooth being hardfaced.

12. The robotic cutter welding system of claim 1, further comprising:

the shielding gas flow valve being controllable by the control system.

13. The robotic cutter welding system of claim 1, wherein the control system is configured to control filler material feed rates of the robotic cutter welding system.

14. The robotic cutter welding system of claim 1, further comprising:

an electrical current supplied to the torch being controllable by the control system.

15. A method for depositing hardfacing material on steel teeth of a rolling cutter of a rock bit, the rolling cutter having protruding teeth on a plurality of rows, the method comprising:

providing a vertically oriented plasma transfer arc torch secured to a positioner having controllable movement in a substantially vertical plane;

securing the cutter to a chuck mounted on an articulated arm of a robot;

positioning a surface of a tooth of the cutter in a substantially perpendicular relationship beneath the torch;

oscillating the torch along a substantially horizontal axis;

moving the cutter with the articulated arm of the robot beneath the oscillating torch; and, depositing a hardfacing material on the tooth of the rolling cutter; wherein an amperage of the torch proportionally increases as a weld path moves toward a thicker portion of the tooth.

16. The method for hardfacing a rolling cutter of a rock bit of claim 15, further comprising:

Measuring a voltage of a transferred arc between a torch electrode and the cutter;

communicating the voltage measurement data to a PLC controller;

calculating the arithmetical difference between the measured voltage and a desired voltage;

calculating an arc length adjustment needed to obtain the desired voltage; and, actuating a torch positioner to vertically move an arc length adjustment.

17. The method for hardfacing a rolling cutter of a rock bit of claim 15, further comprising:

Actuating a torch positioner to vertically move the torch relative to the surface of the tooth, and;

wherein the vertical movement maintains a substantially constant voltage output of the torch.

18. The method for hardfacing a rolling cutter of a rock bit of claim 15, further comprising:

the oscillation of the torch along the horizontal axis having a path length of between approximately 1 mm and 16 mm.

19. The method for hardfacing a rolling cutter of a rock bit of claim 15, further comprising:

the oscillation of the torch along the horizontal axis having a path length of between approximately 6 mm and 10 mm.

20. The method for hardfacing a rolling cutter of a rock bit of claim 15, further comprising:

oscillating the torch along a substantially horizontal axis; and, moving the cutter with the articulated arm of the robot beneath the oscillating torch to generate a generally triangular waveform.

21. The method for hardfacing a rolling cutter of a rock bit of claim 15, further comprising:
providing a target path forming a first waveform about a centerline of the tooth surface to be hardfaced;
the target path having tooth traversing portions substantially parallel to a crest portion of the tooth;
the target path having a step path portion interconnecting two traversing path portions;
the step path being substantially parallel to an edge of the tooth; and,
moving the cutter such that a midpoint of the torch oscillation substantially follows the target path.

22. The method for hardfacing a rolling cutter of a rock bit of claim 15, wherein
an amperage of the torch is proportional to a length of a traversing path.

23. The method for hardfacing a rolling cutter of a rock bit of claim 21, further comprising:
providing a strike path;
the strike path having a strike point at one end; the strike path having an opposite end connected to the target path;
the strike point being located at least 4 mm away from a crest of the tooth; and,
wherein an arc strike is initiated at the strike point prior to deposition of the hardfacing on the strike path.

24. The method for hardfacing a rolling cutter of a rock bit of claim 22, further comprising locating the torch over a strike point; and,
striking and stabilizing an arc between the tooth and the torch.

25. The method for hardfacing a rolling cutter of a rock bit of claim 21, further comprising:
the target path beginning near a crest portion of the tooth and ending near a base portion of the tooth.

26. The method for hardfacing a rolling cutter of a rock bit of claim 21, further comprising:
the traversing paths and step paths forming a generally trapezoidal waveform about the centerline of the tooth; and,
wherein the waveform has an increasing amplitude in the direction of the base of the tooth.

27. The method for hardfacing a rolling cutter of a rock bit of claim 21, further comprising:
a path speed of the step path being greater than the path speed of the traversing path.

28. The method for hardfacing a rolling cutter of a rock bit of claim 21, further comprising:
the oscillation of the torch dwelled for a dwell period at a plurality of extents of the torch's oscillation.

29. The method for hardfacing a rolling cutter of a rock bit of claim 28, further comprising:
the dwell period being between about 0.1 to 0.6 seconds.

30. A method for depositing hardfacing material on steel teeth of a rolling cutter of a rock bit, the rolling cutter having protruding teeth on a plurality of rows, the method comprising:
providing a vertically oriented plasma transfer arc torch secured to a positioner having controllable movement in a substantially vertical plane;
securing the cutter to a chuck mounted on an articulated arm of a robot;
positioning a surface of a tooth of the cutter in a substantially perpendicular relationship beneath the torch;
providing a first waveform target path;
oscillating the torch along a substantially horizontal axis; and,
moving the cutter with the articulated arm of the robot beneath the midpoint of the oscillating torch path so as to impose a second torch waveform onto the first waveform target path to create a hardfacing pattern on the tooth.

31. The method for hardfacing a rolling cutter of a rock bit of claim 30, further comprising:
oscillating the cutter's orientation to the torch about the z-axis of the midpoint of the torch oscillation as the cutter is moved; and,
wherein the oscillation of the cutter is a function of the cutter's position on the target path.

32. The method for hardfacing a rolling cutter of a rock bit of claim 30, further comprising:
oscillation of the cutter created by gradually articulating the cutter between step paths as the oscillation midpoint of the oscillating torch passes over traversing paths.

33. The method for hardfacing a rolling cutter of a rock bit of claim 30, further comprising:
oscillation of the cutter being dwelled as the cutter is moved along step paths.

34. A method for depositing hardfacing material on steel teeth of a rolling cutter of a rock bit, the rolling cutter having protruding teeth on a plurality of rows, the method comprising:
providing a vertically oriented plasma transfer arc torch, secured to a positioner in a substantially vertical plane;
securing the cutter to a chuck mounted on the articulated arm of a robot;
positioning a surface of a tooth of the cutter in a substantially horizontal plane beneath the torch;
depositing a bead of hardfacing material on the tooth of the rolling cutter while moving the cutter with the articulated arm of the robot; and
preheating the cutter prior to depositing the hardfacing.

35. The method for hardfacing a rolling cutter of a rock bit of claim 34, further comprising:
repositioning the cutter to deposit hardfacing material on a second tooth not adjacent to the hardfaced tooth.

36. The method for hardfacing a rolling cutter of a rock bit of claim 34, further comprising:
depositing hardfacing in a series of paths beginning from a tip portion of the tooth to across the root portion of the tooth.

37. The method for hardfacing a rolling cutter of a rock bit of claim 34, further comprising:
depositing hardfacing at a path rate of between 0.5 to 3.5 mm per second.

38. The method for hardfacing a rolling cutter of a rock bit of claim 34, further comprising:
depositing hardfacing on a crest portion of a tooth in multiple layers deposited in at least two interrupted passes.

39. The method for hardfacing a rolling cutter of a rock bit of claim 34, further comprising:
depositing a first layer of hardfacing on a crest portion of a first tooth;
depositing a layer of hardfacing on a second tooth; and,
depositing a second layer of hardfacing on the crest portion of the first tooth.

40. The method for hardfacing a rolling cutter of a rock bit of claim 39, further comprising:
depositing a first layer of hardfacing on a crest portion of a first tooth;
depositing a second layer of hardfacing on the crest portion; and, wherein the second layer of hardfacing substantially overlaps the first layer.

41. A method for hardfacing a rolling cutter of a rock bit, the method comprising:
provoking a rolling cutter having protruding teeth with thin and thick portions;
providing a plasma transfer arc torch secured to a positioner having program controllable motion;
securing the rolling cutter to a chuck mounted on an articulated arm of a robot having programmable controlled motion;
beginning a weld path at a thin portion of the tooth and depositing a hardfacing in a path directed towards the thicker portion of the tooth; and,
increasing an amperage of the torch in proportion to the weld area as the torch path moves towards a thicker portion of the tooth.

42. A method for hardfacing a rolling cutter of a rock bit, the method comprising:
providing a rolling cutter having protruding teeth;
providing indexing indicium on the rolling cutter;
indexing a positioning sensor to the indicium on the rolling cutter to determine a location of the cutter; and,
calibrating the torch location to the rolling cutter based indexed cutter location.

43. A cutter of a rock bit having a plurality of teeth, the cutter comprising:
at least one tooth having a surface and a surface centerline;
hardfacing substantially covering the surface; and,
the hardfacing forming beads aligned in rows substantially perpendicular to the surface centerline; and,
wherein alternating rows of hardfacing beads are oppositely angled in relation to the surface centerline.

44. A cutter of a rock bit having a plurality of teeth, the cutter comprising:
at least one tooth having a surface, opposite side edges, and a surface centerline;
hardfacing substantially covering the surface; and,
the hardfacing forming beads aligned in rows substantially perpendicular to the surface centerline; and,
a row of hardfacing beads being aligned substantially parallel with the edges of the tooth near the edges of the tooth, and being aligned substantially parallel to the surface centerline near the surface centerline of the tooth.

* * * * *